(12) United States Patent
Anavy et al.

(10) Patent No.: US 12,443,366 B2
(45) Date of Patent: *Oct. 14, 2025

(54) MOLECULAR DATA STORAGE SYSTEMS AND METHODS

(71) Applicant: TECHNION RESEARCH AND DEVELOPMENT FOUNDATION LTD., Haifa (IL)

(72) Inventors: Leon Anavy, Haifa (IL); Zohar Yakhini, Ramat Hasharon (IL); Roee Amit, Haifa (IL)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 1252 days.

This patent is subject to a terminal disclaimer.

(21) Appl. No.: 17/101,824

(22) Filed: Nov. 23, 2020

(65) Prior Publication Data

US 2021/0141568 A1 May 13, 2021

Related U.S. Application Data

(63) Continuation-in-part of application No. PCT/IL2019/050572, filed on May 21, 2019.
(Continued)

(51) Int. Cl.
  *G06F 3/06* (2006.01)
  *G06N 3/123* (2023.01)
  (Continued)

(52) U.S. Cl.
  CPC .......... *G06F 3/0659* (2013.01); *G06F 3/0604* (2013.01); *G06F 3/064* (2013.01);
  (Continued)

(58) Field of Classification Search
  CPC ...... G06F 3/0604; G06F 3/064; G06F 3/0673; G06F 3/0659; G06N 3/123; G11C 13/0014
  See application file for complete search history.

(56) References Cited

U.S. PATENT DOCUMENTS 11,810,651 B2 * 11/2023 Erden .................. G16B 5/00
2011/0202280 A1   8/2011 Sikora et al.
(Continued)

FOREIGN PATENT DOCUMENTS

| EP | 3 173 961 A1 | 5/2017 |
| WO | 2018/081566 A1 | 5/2018 |
| WO | 2019/076177 A1 | 4/2019 |

OTHER PUBLICATIONS

Bornholt, et al., Toward a DNA-Based Archival Storage System, IEEE Micro, 2017, pp. 98-104, vol. 37, No. 3.
Church, et al., Next-Generation Digital Information Storage in DNA, Science, Sep. 2012, p. 1628, vol. 337, No. 6102.
Erlich, et al., DNA Fountain enables a robust and efficient storage architecture, Science, Mar. 3, 2017, pp. 950-954, vol. 355.
Gabrys, Asymmetric Lee Distance Codes for DNA-Based Storage, Inf. Theory (ISIT), 2015 IEEE Int. Symp., 2015, pp. 909-913.
Goldman, et al., Toward practical high-capacity low-maintenance storage of digital information in synthesised DNA, Nature, Feb. 7, 2013, pp. 77-80, 494(7435).
Alfonso Jimenez-Sanchez, DNA Computer Code Based on Expanded Genetic Alphabet, European Journal of Computer Science and Information Technology, Dec. 2014, pp. 8-20, vol. 2, No. 4.
LeProust, et al., Synthesis of high-quality libraries of long (150mer) oligonucleotides by a novel depurination controlled process, Nucleic Acids Research, 2010, pp. 2522-2540, vol. 38, No. 8.
McGinn, et al., DNA sequencing—spanning the generations, New Biotechnology, May 2013, pp. 366-372, vol. 30, No. 4.
Organick, et al., Random access in large-scale DNA data storage, Nature Biotechnology, Mar. 2018, pp. 242-249, vol. 36, No. 3.
(Continued)

*Primary Examiner* — Jerry Lin
(74) *Attorney, Agent, or Firm* — FisherBroyles, LLP; Roger L. Browdy; James E. Mrose

(57) ABSTRACT

A data storage system and method are provided, as well as systems and methods for fabrication, and writing and reading of data therein. The data storage system includes at least one population of molecular sequences including chains of basic molecular building-blocks, and defining at least one respective data-block encoding data in the data storage system. The data of the data-block is encoded in a sequence $S=(\pi^1, \pi^2, \ldots, \pi^k \ldots, \pi^{K-1}, \pi^K)$ of encoded letters $\{\pi^k\}$ associated with an alphabet $\Sigma \equiv \{\sigma_m\}|_{m=1\ to\ M}$, which are encoded according to the types of basic molecular building-blocks appearing at k respective location along storage segments of the molecular sequences of the population. The molecular sequences include a number Z of different types of basic molecular building-blocks $\{E^n\}|_{n=1\ to\ Z}$, while the alphabet $\Sigma$ has a size M strictly greater than the number Z of types of building-blocks. Each alphabet letter $\sigma_m$ is associated with a vector $\{P_m^n\}|_{n=1\ to\ Z}$ indicative of occurrences of basic molecular building-block $E^n$ of type n in the alphabet letter $\sigma_m$. Accordingly each encoded letter $\pi^k$ at location k in the storage segments of molecular sequences of the data-block/population, is mapped to a corresponding alphabet letter $\sigma_m$ by determining a match between the occurrence of basic molecular building-blocks of different types at that locations k of the molecular sequences of the population, with the vector $\{P_m^n\}|_{n=1\ to\ Z}$ associated with the alphabet letter $\sigma_m$. In some implementations the component $P_m^n$ of the vector $\{P_m^n\}_{m|n=1\ to\ Z}$ associated with alphabet letter $\sigma_m$ is indicative of a probability that a basic molecular building-block $E^n$ of type n, $1 \leq n \leq Z$, appears at the location k of the storage segment of a molecular strand of the at least one population in case the letter $\pi^k$ encoded at that location k corresponds to the alphabet letter $\sigma_m$.

25 Claims, 12 Drawing Sheets

(7 of 12 Drawing Sheet(s) Filed in Color)

Related U.S. Application Data

(60) Provisional application No. 62/674,114, filed on May 21, 2018.

(51) Int. Cl.
    *G11C 13/00* (2006.01)
    *G06F 111/14* (2020.01)

(52) U.S. Cl.
    CPC ........... *G06F 3/0673* (2013.01); *G06N 3/123* (2013.01); *G11C 13/0014* (2013.01); *G06F 2111/14* (2020.01); *G11C 13/0019* (2013.01)

(56) References Cited

U.S. PATENT DOCUMENTS

| | | | |
|---|---|---|---|
| 2017/0141793 A1 | 5/2017 | Strauss et al. | |
| 2018/0046921 A1 | 2/2018 | Chen et al. | |
| 2018/0101487 A1 | 4/2018 | Peck | |
| 2018/0265921 A1* | 9/2018 | Chen | G16B 99/00 |
| 2019/0355442 A1 | 11/2019 | Merriman et al. | |

OTHER PUBLICATIONS

Yazdi, et al., A Rewritable, Random-Access DNA-Based Storage System, Sci. Rep., Sep. 2015, p. 14138, vol. 5.

Church GM, Gao Y, Kosuri S. Next—generation digital information storage in DNA. Science. 2012;337(6102):1628. doi:10.1126/science.1226355.

Goldman N, Bertone P, Chen S, . . . Birney E. Towards practical, high—capacity, low—maintenance information storage in synthesized DNA. Nature. 2013;494 (7435):77-80. doi:10.1038/nature11875.

Erlich Y, Zielinski D. DNA Fountain enables a robust and efficient storage architecture. Science (80-). 2017;355 (6328):950-954. doi:10.1126/science.aaj2038.

Mcginn S, Gut IG. DNA sequencing—spanning the generations. N Biotechnol. 2013;30(4):366-372. doi:10.1016/j.nbt.2012.11.012.

LeProust EM, Peck BJ, Spirin K, . . . Caruthers MH. Synthesis of high—quality libraries of long (150mer) oligonucleotides by a novel depurination controlled process. Nucleic Acids Res. 2010;38(8):2522-2540.doi:10.1093/nar/gkq163.

Jiménez-Sánchez A. Dna Computer Code Based on Expanded Genetic Alphabet. Eur J Comput Sci Inf Technol. 2014;2(4):8-20. doi:10.13140/2.1.3305.4408.

Ouchi M, Badi N, Lutz JF, Sawamoto M. Single-chain technology using discrete synthetic macromolecules. Nat Chem. 2011;3(12):917-924. doi:10.1038/nchem.1175.

Lutz JF, Ouchi M, Liu DR, Sawamoto M. Sequence-controlled polymers. Science (80-).2013;341(6146). doi:10.1126/science.1238149.

Organick L, Ang SD, Chen Y-J, . . . Strauss K. Random access in large—scale DNA data storage. Nat Biotechnol. 2018;36(3):242-248. doi:10.1038/nbt.4079.

Loose M, Malla S, Stout M. Real-time selective sequencing using nanopore technology. Nat Methods. 2016;13(9):751-754. doi:10.1038/nmeth.3930.

Ferrante M, Saltalamacchia M. The Coupon Collector's Problem. 2014;35(2):pp. www.mat.uab.cat/matmat. Accessed Dec. 3, 2018.

Anavy L, Vaknin I, Atar O, Amit R, Yakhini Z. Data storage in DNA with fewer synthesis cycles using composite DNA letters. Nat Biotechnol. 2019;37(10):1237-1237. doi:10.1038/s41587-019-0281-1.

Ceze, L., et al. 2019. Molecular digital data storage using DNA, Nature, pp. 1-11 (2019).

Wang, Y. et al., Construction of bio-constrained code for DNA data storage, No. 6 p. 963-966. Apr. 22, 2019.

\* cited by examiner

Table 2

| P(A) | P(C) | P(G) | P(T) | Σ |
|---|---|---|---|---|
| 100% | 0% | 0% | 0% | $\sigma_1$ |
| 75% | 25% | 0% | 0% | $\sigma_2$ |
| 75% | 0% | 25% | 0% | $\sigma_3$ |
| 75% | 0% | 0% | 25% | $\sigma_4$ |
| 50% | 50% | 0% | 0% | $\sigma_5$ |
| 50% | 25% | 25% | 0% | $\sigma_6$ |
| 50% | 25% | 0% | 25% | $\sigma_7$ |
| 50% | 0% | 50% | 0% | $\sigma_8$ |
| 50% | 0% | 25% | 25% | $\sigma_9$ |
| 50% | 0% | 0% | 50% | $\sigma_{10}$ |
| 25% | 75% | 0% | 0% | $\sigma_{11}$ |
| 25% | 50% | 25% | 0% | $\sigma_{12}$ |
| 25% | 50% | 0% | 25% | $\sigma_{13}$ |
| 25% | 25% | 50% | 0% | $\sigma_{14}$ |
| 25% | 25% | 25% | 25% | $\sigma_{15}$ |
| 25% | 25% | 0% | 50% | $\sigma_{16}$ |
| 25% | 0% | 75% | 0% | $\sigma_{17}$ |
| 25% | 0% | 50% | 25% | $\sigma_{18}$ |
| 25% | 0% | 25% | 50% | $\sigma_{19}$ |
| 25% | 0% | 0% | 75% | $\sigma_{20}$ |
| 0% | 100% | 0% | 0% | $\sigma_{21}$ |
| 0% | 75% | 25% | 0% | $\sigma_{22}$ |
| 0% | 75% | 0% | 25% | $\sigma_{23}$ |
| 0% | 50% | 50% | 0% | $\sigma_{24}$ |
| 0% | 50% | 25% | 25% | $\sigma_{25}$ |
| 0% | 50% | 0% | 50% | $\sigma_{26}$ |
| 0% | 25% | 75% | 0% | $\sigma_{27}$ |
| 0% | 25% | 50% | 25% | $\sigma_{28}$ |
| 0% | 25% | 25% | 50% | $\sigma_{29}$ |
| 0% | 25% | 0% | 75% | $\sigma_{30}$ |
| 0% | 0% | 100% | 0% | $\sigma_{31}$ |
| 0% | 0% | 75% | 25% | $\sigma_{32}$ |
| 0% | 0% | 50% | 50% | $\sigma_{33}$ |
| 0% | 0% | 25% | 75% | $\sigma_{34}$ |
| 0% | 0% | 0% | 100% | $\sigma_{35}$ |

Fig. 2

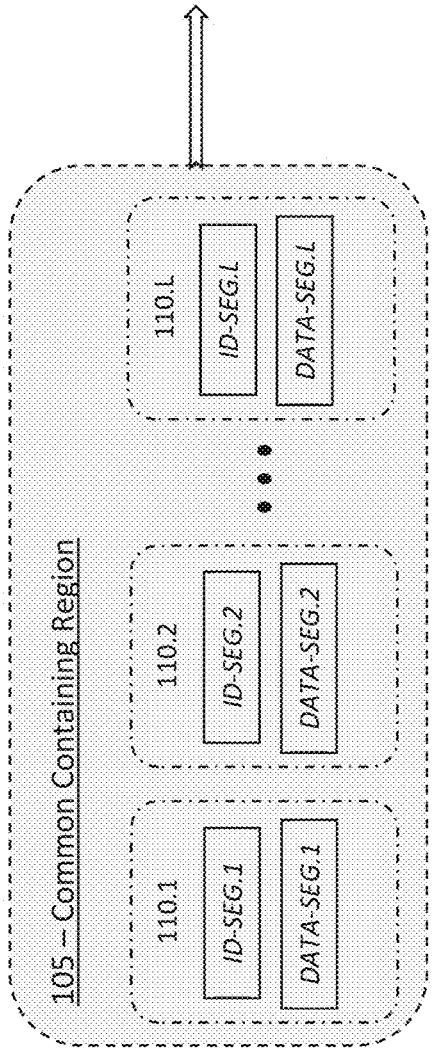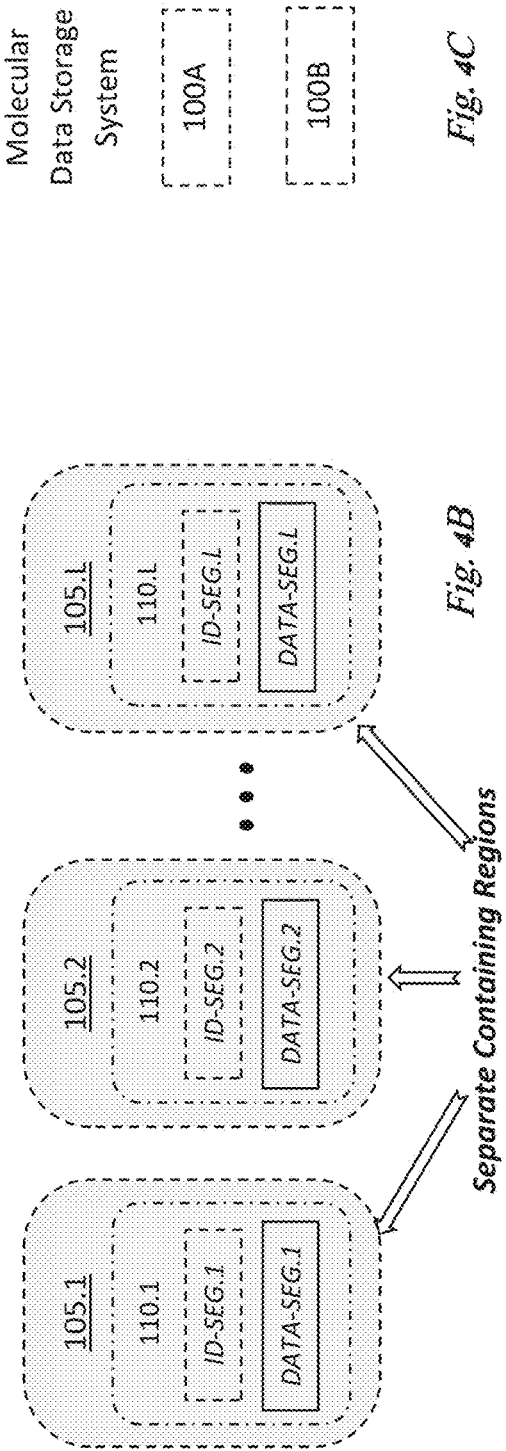

200 – A Method for Storing Data

210 — Providing data of a data-block to be encoded by respective population of molecular sequences/strands that are formed with a number Z of different types of basic molecular building-blocks $\{E^n\}|_{n=1 \text{ to } Z}$.

220 — Encoding the data of the data-block into a data sequence $S = (\sigma^1, \sigma^2, ..., \sigma^k..., \sigma^{K-1}, \sigma^K)$ of letters belonging to an alphabet $\Sigma \equiv \{\sigma_m\}|_{m=1 \text{ to } M}$ having a size $M \equiv |\Sigma|$ greater than said the number Z of the different types of basic molecular building-blocks

230 — Writing (e.g. physically encoding) the data sequence S in an encoded sequence $S' = \{\pi^1, \pi^2, ..., \pi^k..., \pi^{K-1}, \pi^K\}$ of encoded letters encoded in the population of molecular sequences/strands, whereby:

232 — each alphabet letter $\sigma_m$ in the alphabet $\Sigma \equiv \{\sigma_m\}_{m=1 \text{ to } M}$ is defined by a probability vector $\sigma_m \equiv \{P_m^n\}_{n=1 \text{ to } Z}$ indicative of relative amounts of the Z types of basic molecular building-blocks $\{E^n\}_{n=1 \text{ to } Z}$;

234 — an encoded letter $\pi^k$ at location k of the sequence $S'$ is indicated by the relative amounts/concentrations $\{C(E_n)\}_{n=1 \text{ to } Z}$ of molecular building-blocks of the different types that exist at a certain respective location corresponding to k along the sequences of the plurality of molecular strands of the population; and

236 — the encoded letter $\pi^k$ corresponds to a respective alphabet letter $\sigma^k \in \Sigma$ for which the probability vector $\{P^{k,n}\}$ corresponds to the amounts/concentrations $\{C(E_n)\}_{n=1 \text{ to } Z}$ of the different types of basic molecular building-blocks.

240 — Optionally, encoding, in each of the molecular strands/sequences of the population, an identifying sequence of basic molecular building-blocks selected from the Z types, whereby the identifying sequence is uniquely indicative of the data-block whose data is encoded in the population.

250 — Optionally, repeating operations 210 to 240 for encoding data of a plurality of data blocks in a plurality of respective populations.

252 — Optionally, locating the different populations at different regions to distinguish between molecules of different populations.

254 — Optionally, including different identifications segments in molecules of different populations to distinguish between them.

*Fig. 5*

400 – A Method for reading Data

410 — Providing a molecular data storage system including at least one population of molecular strands/sequences formed with a number Z of different types of basic molecular building-blocks $\{E^n\}|_{n=1\ to\ Z}$ by which data of at least one data-block is encoded;

420 — Optionally, prior to sequencing, molecules of a certain population are distinguished (e.g. separated), from molecules of other populations (if any).

422 — Optionally: this at least one population includes only one population being said certain population;

424 — Optionally: the molecules of the certain population reside separately from other populations, and they are sequenced

426 — Optionally: the molecules of the certain population include population identification segments that uniquely identify the certain population to which they belong, and the method includes binding to those population identification segments for extracting at least some molecular sequences of the certain population for the sequencing;

Optionally, a difference of the population identification segments indicating different populations is sufficiently large such that the binding is substantially exclusive to population identification segments of the certain population.

430 — Applying N fold sequencing depth to molecular strands/sequences of a certain population.

440 — Optionally, after the sequencing, molecular strands/sequences of the certain population are distinguished, from molecular strands/sequences of other populations if any, by utilizing the sequencing to identify molecules whose population identification segments are indicative of the certain population.

450 — Processing data storage segments of the sequenced molecular strands/sequences of the certain population to determine, per each location k of K locations in the data storage segments, an observed probability vector $X^k$ indicative of observed relative amounts of the Z types of basic molecular building-blocks $\{E^n\}$ in the location k.

*Fig. 8A*

460 — Associating each observed probability vector $X^k$ with an inferred letter $\sigma'^k$ of an alphabet $\Sigma \equiv \{\sigma_m\}|_{m=1\ to\ M}$, thereby determining a sequences $S''$ of inferred alphabet letters $= (\sigma'^1, \sigma'^2, ..., \sigma'^k..., \sigma'^{K-1}, \sigma'^K)$ corresponding to an encoded sequence $S' = (\pi^1, \pi^2, ..., \pi^k..., \pi^{K-1}, \pi^K)$ in the certain population.

- 461 — mapping the observed probability vector $X^k$ to the inferred alphabet letter $\sigma'^k \in \Sigma$ that satisfies a minimum divergence D from the observed probability vector $X^k$, $\sigma'^k = \text{ArgMin}[\{\sigma_m\}_{m=1\ to\ M} \mid D(\sigma_m, X^k)]$;
  - Optionally - $D(\sigma_m, X^k)$ is an LP distance function, (e.g. Euclidian distance;
  - Optionally - $D(\sigma_m, X^k)$ is KL divergence;

- 463 — the alphabet $\Sigma$ having a size $M \equiv |\Sigma|$ greater than said the number Z of the different types of basic building-blocks (M>Z);

- 464 — each letter $\sigma_m$ of the alphabet $\Sigma$ is defined by a probability vector $\sigma_m \equiv \{P_m^n\}|_{n=1\ to\ Z}$ indicative of relative amounts of the Z types of basic molecular building-blocks $\{E^n\}|_{n=1\ to\ Z}$;

- 466 — the alphabet $\Sigma$ includes at least one composite letter $\sigma_{m1}$, whose probability vector $\{P_{m1}^n\}$ includes two or more non-zero probabilities;

- 467 — Optionally the alphabet $\Sigma$ includes at least one simple letter $\sigma_{m2}$ (typically more) whose probability vector $\{P_{m2}^n\}$ includes only non-zero probability;

*Fig. 8B*

600 – A Method for Synthesizing a Molecular Data Storage

610 — Providing a support substrate/plate for synthesizing polymers formed with Z different types of molecular building-blocks

620 — Providing one or more blocks of data each coded by sequence S of letters $S = \{\sigma^k\}|_{k=1 \text{ to } K}$ of an alphabet $\Sigma$ having a size $M \equiv |\Sigma|$ greater than said the number Z of the different types of basic molecular building-blocks (M>Z)

630 — Per each block of data, synthesizing, at a distinct region of the support substrate, a corresponding population of molecular sequences/strands comprising strings of the basic molecular building-blocks of the Z types $\{E^n\}|_{n=1 \text{ to } Z}$, such that the population encodes the sequence of letters $\{\sigma^k\}|_{k=1 \text{ to } K}$ of the block of data, by carrying out the following (e.g. sequentially/orderly) per each letter $\sigma^k$:

632 — Providing a volume of basic molecular building-blocks $\{E_n\}$ of one or more of the Z types, with relative concentrations corresponding to the respective letter $\sigma^k$ (e.g. corresponding to the probability vector defining the letter).

Optionally, the volume is acquired from a pre-prepared mixture having the relative concentrations; Alternatively, the volume with the concentrations is prepared in-situ;

Optionally, the basic molecular building-blocks of the volume are being blocked from binding to one another;

634 — Depositing/placing the volume of basic molecular building-blocks at the certain region of the data block, to enable their binding to molecular sequences/strands at the certain region;

Optionally, washing/removing non-bonded basic molecular building-blocks from the certain region;

Optionally, un-blocking the basic molecular building-blocks binded to molecular sequences/strands at the distinct region;

640 — Synthesizing, in the molecular sequences/strands of the population, a population identification segment indicative of the population and including an identifying sequence (e.g. of predetermined length) of the basic molecular building-blocks;

650 — Optionally, the molecular sequences/strands are bonded to cleavable molecules that were a-priori residing at the region; and the method includes harvesting the population of molecules by cleaving the cleavable molecules.

*Fig. 10*

MOLECULAR DATA STORAGE SYSTEMS AND METHODS

TECHNOLOGICAL FIELD AND BACKGROUND

The present invention is in the field of data storage technologies and is particularly related to molecular data storage systems and methods, such as DNA based data storage.

In recent years, various DNA based data storage systems have been developed. Such systems are advantageous because of their remarkable data density and long-term stability of DNA. The first demonstrations of DNA based data storage, on a megabyte scale, were revealed in 2012 in two independent studies[1], [2]. In a recent work, the Shannon information capacity of DNA was demonstrated, using fountain code error correction, to be ~1.57 bit per synthesized position [3].

BACKGROUND ART

References considered to be relevant as background to the presently disclosed subject matter are listed below:

[1] G. M. Church, Y. Gao, and S. Kosuri, "Next-generation digital information storage in DNA.," *Science*, vol. 337, no. 6102, p. 1628, September 2012.

[2] N. Goldman, P. Bertone, S. Chen, C. Dessimoz, E. M. LeProust, B. Sipos, and E. Birney, "Towards practical, high-capacity, low-maintenance information storage in synthesized DNA," *Nature*, vol. 494, no. 7435, pp. 77-80, February 2013.

[3] Y. Erlich and D. Zielinski, "DNA Fountain enables a robust and efficient storage architecture," *Science* (80-.)., vol. 355, no. 6328, pp. 950-954, 2017.

[4] S. Mcginn and I. G. Gut, "DNA sequencing—spanning the generations," *N. Biotechnol.*, vol. 30, no. 4, pp. 366-372, 2013.

[5] E. M. LeProust, B. J. Peck, K. Spirin, H. B. McCuen, B. Moore, E. Namsaraev, and M. H. Caruthers, "Synthesis of high-quality libraries of long (150 mer) oligonucleotides by a novel depurination controlled process," *Nucleic Acids Res.*, vol. 38, no. 8, pp. 2522-2540, May 2010.

[6] L. Organick, S. D. Ang, Y.-J. Chen, R. Lopez, S. Yekhanin, K. Makarychev, M. Z. Racz, G. Kamath, P. Gopalan, B. Nguyen, C. N. Takahashi, S. Newman, H.-Y. Parker, C. Rashtchian, K. Stewart, G. Gupta, R. Carlson, J. Mulligan, D. Carmean, G. Seelig, L. Ceze, and K. Strauss, "Random access in large-scale DNA data storage," *Nat. Biotechnol.*, vol. 36, no. 3, pp. 242-248, February 2018.

[7] A. Jimenez-Sanchez, "Dna Computer Code Based on Expanded Genetic Alphabet," *Eur. J. Comput. Sci. Inf. Technol.*, vol. 2, no. 4, pp. 8-20, 2014.

[8] R. Gabrys, H. M. Kiah, and O. Milenkovic, "Asymmetric Lee Distance Codes for DNA-Based Storage," *If Theory (ISIT), 2015 IEEE Int. Symp.*, pp. 909-913, 2015.

[9] S. M. H. Tabatabaei Yazdi, Y. Yuan, J. Ma, H. Zhao, O. Milenkovic, C. Bancroft, T. Bowler, B. Bloom, C. T. Clelland, J. Davis, G. M. Church, Y. Gao, S. Kosuri, N. Goldman, R. N. Grass, R. Heckel, M. Puddu, D. Paunescu, W. J. Stark, M. G. Ross, G. D. Cohen, S. Litsyn, M. Blaum, S. Litsyn, V. Buskens, H. C. van Tilborg, E. Gilbert, H. Packer, A. V. Bryksin, I. Matsumura, S. C. Schuster, H. Morita, A. J. van Wijngaarden, A. H. Vinck, O. Milenkovic, N. Kashyap, J.-M. Rouillard, M. Zuker, E. Gulari, L. J. Guibas, A. M. Odlyzko, J. L. Massey, D. Bajic, Y. M. Chee, H. M. Kiah, P. Purkayastha, C. Wang, P. Berman, and M. Frer, "A Rewritable, Random-Access DNA-Based Storage System," *Sci. Rep.*, vol. 5, p. 14138, September 2015.

[10] J. Bornholt, R. Lopez, D. M. Carmean, L. Ceze, G. Seelig, and K. Strauss, "Toward a DNA-Based Archival Storage System," in *IEEE Micro*, 2017, vol. 37, no. 3, pp. 98-104.

Acknowledgement of the above references herein is not to be inferred as meaning that these are in any way relevant to the patentability of the presently disclosed subject matter.

GENERAL DESCRIPTION

There is a need in the art for a novel approach to molecular based data storage techniques, e.g. DNA-based storage systems, with improved data storage capacity/density.

Indeed, current DNA synthesis and sequencing technologies process large numbers of nominally identical molecules in parallel [4], [5], which leads to significant information redundancy that is inherent in current DNA based storage schemes.

The present invention utilizes a composite letter alphabet approach, in which each letter (composite letter) is defined by a predetermined mixture of molecular bases (i.e. mixture of one or more basic molecular building blocks which are used in the data storage or tagging/marking/labeling agent, e.g. mixture of DNA base types) and thereby leverages this information redundancy and enables higher information capacity. The invention is based on the inventors' understanding of the mathematical properties of composite DNA letters and how this can be used for a coding scheme to be used in composite DNA based storage systems. The principles of the invention are not limited to DNA-based storage systems, but are relevant for any molecular-sequence-based storage system and can be implemented by utilizing the composite letter alphabet approach with any suitable types of molecular bases to form a molecular-sequence-based storage system. Storage should also be understood to include using the synthesized material for tagging/marking and labeling purposes. To this end, the material composition (the population of molecules) used for storing data, according to the present invention, may also be used as a tagging/marking/labeling agent, namely as a data carrying marking/identification composition which may be included in, or used as, a tag, marker or label.

For clarity it should be noted that the terms bases and monomers are used herein interchangeably to designate the basic molecular units/building-blocks used in the molecular-sequence-based storage system of the present invention. Sequences of such basic molecular units/building-blocks (e.g. sequences of monomers), which are also referred to herein interchangeably and without loss of generality as polymers, are used for storing information in the molecular-sequence-based storage system. In this connection it should be noted that data is encoded in the data storage by the arrangement of monomers (i.e. basic molecular building-blocks/units) in the molecular sequences/strands. To this end, it should be understood that the molecular strand/sequence as used herein designates a molecule formed as, or at least including in its data storage section, a chain or string of the predetermined basic molecular building-blocks which are used by the storage system of the present invention for storing data. Accordingly, the following phrases may be used herein interchangeably to designate the molecular sequences/strands whose populations are used according to the present invention for storing data: molecular sequences molecular strands, molecular chains, molecular strings. Additionally, these molecular sequences/strands are also sometimes referred to herein as polymers, and it should be understood that the term polymer used in this connection is not limited to repeatable sequence of building-blocks/monomers, but designates any sequence of building-blocks/monomers and in fact the order of the building block types in the sequence may directly or statistically encode information. To this end, the term polymers used herein should be interpreted broadly as designating any sequence of basic molecular units/building-blocks (monomers) and not only repeated/periodic sequences. Accordingly, the term monomers should be interpreted broadly as designating basic molecular units/building blocks which are not necessarily repeated in any periodicity in the molecular strands/sequences (e.g. polymers) of the data storage.

Some embodiments of the storage system of the invention are more specifically described/exemplified here with respect to molecular sequences/strands (e.g. hereinafter also polymers) constructed of the A, G, C, T DNA nucleotides, which serve here as the basic molecular units/building-blocks (e.g. hereinafter for short monomers) of the molecular-sequences/polymers of the data storage system.

Other embodiments of the storage system of the invention are more specifically described/exemplified here with respect to molecular strands/sequences (e.g. hereinafter referred to as polymers) constructed of basic molecular units/building-blocks (e.g. monomers), which may be formed as short oligomers (i.e. oligos) of preselected compositions of basic units (e.g. nucleotides or other basic units/elements/bases). For instance such oligos of preselected compositions may be characterized by certain predetermined number/length and order of the basic units, which may be for instance A, G, C, T nucleotides. For instance, the basic building-blocks/monomers may be preselected oligos of length 3 such as: A-G-T; A-T-C; G-A-C; G-C-T; T-G-A; T-C-A; C-A-T; and C-A-G.

It should be understood that the invention is not limited to these specific sets of basic building block types (e.g. monomer types) nor to DNA/RNA chemistry or nucleotides and can be implemented with the building blocks/monomers constructed or formed with other types of chemical moieties (e.g. or other types of, possibly synthetic, "nucleotides" as well as motif types such as trinucleotides, dinucleotides, pentanucleotides, 20-mers). In this regard, it should be noted that in order to enable efficient writing (synthesis) and reading (sequencing) of a data encoding population of molecular sequences/strands, the basic molecular building-blocks which are used by the technique of the present invention relatively short k-mers (oligomers) having a limited number of bases/basic-units/elements, having typically no more than few tens of basic units, preferably ranging from a single basic unit and up-to not more than 20 bases/basic units/elements (e.g. k-mers in which k is within the range from 1 to 20), and even more preferably are preferably having only few bases/basic-units (i.e. less than ten), such as 3 basic units. This is because longer oligonucleotides will lead to longer unnecessary sequencing and will complicate the synthesis process and its stability. To this end, in some implementations it may be most convenient to implement the present invention with basic molecular building-blocks formed as single-mers (such as the A, G, C, T nucleotides/nucleobases of the DNA the A, G, C, U nucleotides/nucleobases of the RNA, or other chemistry, e.g. of synthetic polymers). Alternatively in some embodiments resilience and error correction improvement can be achieved basic molecular building-blocks constructed as short multi-mers, with preferably not more than 20 bases/basic units/elements (in this case practically the use of short tri-mers, i.e. having 3 bases, e.g. trinucleotides, may be preferred for practical reasons).

In this regard, a conceptual distinction may be clarified here between the terms basic molecular building-blocks (also indicated as building-blocks), which is used herein to designate the basic building block unit which is used to encode data in the molecular data storage of the present invention, and the terms bases/basic-units/elements which are used herein merely to exemplify that the basic molecular building-blocks used by the technique of the present invention, and which may be predetermined types of short k-mers/ oligos formed with a predetermined number of bases/basic-units/elements. In this connection, it should also be noted that according to the present invention all the basic molecular building-blocks which are used according to the technique of the present invention (i.e. all the types of basic molecular building-blocks used for encoding data in a given population of a given molecular data storage system constructed according to the invention) have the same number of bases/basic-units/elements, which, as stated above, is short and is preferably between 1 and 20 bases, and even more preferably having only few bases e.g. 3.

The inventors performed a molecular proof of concept implementation demonstrating the feasibility of the composite alphabet approach-based data storage systems. Performance parameters obtained via analysis of small scale experimental results, in which the DNA nucleotides where used as the basic building blocks for composite alphabet of 15 letters, demonstrated that the system of the invention can achieve information capacity of ~4.3 bits per synthesized position using the DNA building blocks. This presents a significant improvement as compared to the state of the art molecular-based, as well as magnetic media, storage systems. Also it should be understood that this result was achieved utilizing an alphabet of 15 letters only, and that higher data densities may be achieved with composite alphabets of higher resolutions (a larger alphabet having more letters).

The composite alphabet approach can for example be incorporated into and combined with existing DNA based storage and tagging/labeling schemes. Due to significant DNA synthesis vs. sequencing cost differences this leads to substantial potential cost reduction.

To this end, as clarified in more detail below, a composite letter is a representation of a position in a sequence that constitutes a mixture of one or more types of molecular building-blocks used in molecular data storage. For instance, in DNA based molecular data storage, according to the present invention, the composite letter is a composite DNA letter a defined by pre-determined ratio (also termed herein as probability-vector or frequency-vector) $\sigma=(P_A, P_C, P_G, P_T)$ of the standard monomer/base types of DNA (A, G, C and T DNA nucleotides). Writing a composite DNA letter at a given position of a DNA sequence is equivalent to producing (synthesizing) multiple copies (oligonucleotides) of the sequence so that in this given position the different DNA nucleotides are distributed across the synthesized copies according to the probability-vector (frequency-vector) of the respective letter $\sigma$.

The present invention provides a novel technique (system and methods) for synthesizing populations of molecular strands/sequences (also referred to herein as populations of molecular strands/sequences), each population being designed/configured for representing/encoding a sequence of composite letters by which data is encoded, e.g. a single sequence). In this connection, the phrase sequence of composite letters by which the data is encoded, according to the technique of the present invention, should be understood as any sequence that essentially includes composite letters, and may or may not include simple letters (according to the definition of these terms below). For that matter the alphabet used for encoding the data may include only composite letters, or may also include simple letters in addition to the composite ones.

To this end, a distinction should be made between the sequence of composite letters which is represented by each population of the molecules, and the molecular strands/sequences of the population which includes respective chains/strings of the basic molecular building blocks. It should be understood that the sequence of composite letters is determined-by/associated-with the statistics of the types of basic building-blocks arranged in the molecular strands/sequences of the population. In other words each molecular strand/sequence of basic building-blocks does not by itself designate the sequence of letters, but each letter in the sequence of letters is determined-by/associated-with the statistics of the types of basic building blocks at a corresponding position in the strands of the plurality of the molecular strand/sequence.

The synthesis of each such population may be implemented by utilizing various technologies of molecular strand/sequence synthesis (e.g. [5]) while implementing suitable modifications/adaptations to such technologies, as described in detail below, in order to enable production of populations of molecular strands/sequences that define sequences of composite letters by which the data is encoded.

Reading a composite letter may be achieved by the following steps: (a) sequencing of multiple independent molecules of a population representing the certain composite letter sequence; (b) per each position in the sequenced independent molecules, determining the occurrence, e.g. the probability/frequency of occurrence, of each type of basic molecular building block in that position in the set of multiple independent molecules of the population which has been sequenced; and (c) inferring the encoded composite letter in each such position by matching the observed occurrences, e.g. the probabilities/frequencies of occurrences of the different basic molecular building block in that position, with the original ratio or composition of basic building blocks (i.e. the occurrence vectors or the probability/frequency vectors) which define the composite letters of the alphabet, and inferring the encoded composite letter in that position by determining such a match (e.g. best match). Accordingly by repeating (b) and (c) for all valid positions in the multiple independent molecules from a given population, a sequence of encoded composite letters in the population is determined (here the term valid positions designates the positions in the molecules of the population in which data is presumably encoded).

In some implementations, the sequencing itself may be implemented utilizing conventional sequencing technologies (e.g. standard DNA sequencing as in [4]). A novel technique of the invention provides for inferring the original letter encoded in the molecular data storage, based on the observed vector indicative of weather basic building-blocks of certain types should occur the at a position along the strands of the molecular population, at which the letter is encoded (e.g. the vector being in that case occurrence vector). Preferably in some embodiments, the observed vector indicating the probability/frequency (frequency of occurrence) of the basic building-blocks of different types at that position along the strands of the molecular population, at which the letter is encoded.

To this end, the use/introduction of composite letters to the molecular/DNA based data storage extends the available alphabet (i.e. beyond the number of different types of basic molecular building-blocks), and thus allows the coding of longer messages within a fixed synthesized molecule length.

To correctly read a message coded using composite DNA letters, one needs to infer the original composite letter in every position of the sequence from the observed reads. The sequencing readout (i.e. observed sequencing reads) are the product of a complex process, consisting of DNA synthesis, long term storage, sampling, and DNA sequencing. While each step introduces different errors and biases, the most significant parameters that affect the readout are the sampling of molecules to be sequenced, and the sequencing depth. The process can be exemplified by a single model in which the readout result is a multinomial random variable:

$$X^{(N)}(\sigma, wErr, dErr, sErr, iErr) \sim Mult(N, (p_A(\sigma), p_C(\sigma), p_T(\sigma), p_G(\sigma)))$$

The parameters of the distribution are the designed input letter σ, the sequencing depth N, and the errors introduced in the synthesis (wErr), storage (dErr), sequencing (sErr), and inference steps of the process.

The sequencing readout probabilities/frequencies (also referred to herein below as observed probability vectors) will most likely not exactly match any letter from the original alphabet. Inference of the original letter is performed by converting the readout to a vector of base frequencies (also referred to hereinbelow as probability vector) and comparing it to the base frequencies of the candidate letters in the composite alphabet.

The comparison can be done, for example, using the Kullback-Leibler divergence (KL) or the $L^p$ norm, such as $L^1$ norm. To assess the performance of the inference step, the inventors developed a simulation model and analyzed the inference rate of the two inference methods on various composite alphabets. In some implementations, the KL divergence, which corresponds to a maximum likelihood estimator, was found to be advantageous.

It should be understood that the composite alphabet approach of the present invention can generally be combined with other coding schemes, thus providing an even greater benefit. To demonstrate this, the DNA fountain code system [3] was modified to support sequences of composite alphabet letters (particularly in this case an alphabet of composite letters based on DNA monomers/nucleotides was used), thus creating a composite DNA fountain system. The inventors successfully encoded the same data file of 2,116,608 bytes used in [3] by using composite DNA fountains of resolutions R=2,4,6,8,10 while keeping all other parameters similar. Then, the inventors simulated the synthesis and sequencing of the designed composite DNA sequences and decoded the original message by using the composite DNA fountain decoding pipeline developed for this purpose by the inventors. A ~3.7-fold increase was evident in the estimated data density per synthesized position for resolution R=10. In practical terms, this implies a reduction in the number of required DNA oligonucleotides from 72,000 reported in [3]) to 19,300.

DNA based storage systems are limited by chemical constraints of DNA synthesis, storage and sequencing. Conventional techniques deal with these limitations either by employing strict encoding schemes [1], [2], [6] or by using complex coding methodology such as DNA fountains to handle sequence dropout[3]. However, conventional coding schemes/methodologies result in lowering the data storage density/capacity of the DNA based storage.

This is solved according to the technique of the present invention by the use of composite alphabet letters constructed and defined by the occurrence (e.g. frequency/probability of occurrence) of different types of basic building-blocks/monomers in each position of the molecular-strands/polymers/DNA-strands of the data storage system (or of a molecular population within it), by which a composite letter is encoded. Employing a composite alphabet inherently generates balanced molecular strands/sequences, without prevalent biases such as too many Gs or long homopolymers—consecutive occurrences of the same letter (in the context of balanced DNA molecules), resulting from the combinatorial space associated with every designed composite sequence. While unwanted sequences might unavoidably be part of the synthesized molecules, the inherent independence of the different positions renders them negligible, representing an extra benefit of the composite alphabet approach.

Thus according to a first embodiment (embodiment 1) and broad aspect of the present invention, there is provided a data storage system including at least one population of molecular sequences (e.g. molecular strands) defining at least one respective data-block encoding data in the data storage system. The molecular sequences/strands are formed with strings/chains of basic molecular building-blocks including a number Z of different types of basic molecular building-blocks $\{E^n\}|_{n=1 \text{ to } Z}$, by which data of the data-block is encoded. The data of the data-block is encoded as a sequence $S=(\pi^1, \pi^2, \ldots, \pi^k \ldots, \pi^{K-1}, \pi^K)$ of encoded letters $\{\pi^k\}$ associated with an alphabet $\Sigma$ whereby the encoded letters $\{\pi^k\}$ are encoded by the types of basic molecular building-blocks appearing at k respective locations along storage segments of the molecular sequences of the at least one population. The data storage system is characterized in that the alphabet $\Sigma$ has a size M that is strictly greater than the number Z of different types of basic molecular building-blocks used in the at least one population (M>Z). Each alphabet letter $\sigma_m$ in the alphabet $\Sigma \equiv \{\sigma_m\}|_{m=1 \text{ to } M}$ is associated with a vector $\{P_m^n\}|_{n=1 \text{ to } Z}$ whereby $P_m^n$ is indicative of occurrences of basic molecular building-block $E^n$ of type n in the alphabet letter $\sigma_m$. Accordingly, each encoded letter $\pi^k$, which is encoded at that location k in the storage segments of molecular sequences of the data-block, can be mapped (by using the vectors $\{P_m^n\}$ of the alphabet letters $\{\sigma_m\}$) to a corresponding alphabet letter $\sigma_m$, by determining a match between the occurrence of basic molecular building-blocks of different types at the locations k of the molecular sequences of said population, with the vector $\{P_m^n\}|_{n=1 \text{ to } Z}$ associated with the alphabet letter $\sigma_m$.

Certain embodiments (embodiment 2) of the present invention incorporate the features of the above described (embodiment 1) and further include the following: the vector $\{P_m^n\}_{n=1 \text{ to } Z}$ is a probability vector defining the alphabet letter $\sigma_m$. In such embodiments $P_m^n$ indicates a probability that a basic molecular building-block $E^n$ of type n, $1 \leq n \leq Z$, appears at the location k of the storage segment of a molecular strand of said at least one population in case the letter $\pi^k$ which is encoded at that location, k, corresponds to the alphabet letter $\sigma_m$.

Certain embodiments (embodiment 3) of present invention incorporate the features of the above described embodiment 2 and further include an alphabet whose size $|\Sigma|$ (the number of letters) is given by $$M = |\Sigma| = \binom{R+Z-1}{R}$$

whereby Z is the number of distinct types of said basic molecular building-blocks and R is a resolution parameter indicative of an identifiable resolution of the probability (resolution of the identifiable content percentage) at which basic molecular building-blocks of a certain type appear in each location k along the storage segments of the plurality of molecular sequences of the population. In this regard the resolution R may be for example defined as one over the minimum absolute difference between probabilities $P_m^n$ of the basic molecular building-blocks in the definition of the letters $\{\sigma_m\}|_{m=1 \text{ to } M}$ of the alphabet $\Sigma$, such that $R \equiv 1/\text{Min}_{n,m1,m2}[(\text{Abs}(P_{m1}^n - P_{m2}^n))]$ for any type of basic molecular building-block indexed $1 \leq n \leq Z$, and any pair of distinct letters $m1 \neq m2$.

Certain embodiments (embodiment 4) of the data storage system of the present invention incorporate the features of the above described embodiments 2 or 3 and are adapted to being read with N fold nominal sequencing depth or higher. Each encoded letter $\pi^k$ that is being read from the position k, is represented by an observed probability vector $X^k = \{x^k(E^n)/N\}|_{n=1 \text{ to } Z}$ whereby $x^k(E^n)$ is the number of times the basic molecular building-block of type $E^n$ was read in the location k out of the N fold sequencing depth. The observed probability vector $X^k$, is thus indicative of an observed probability that the basic molecular building-blocks of type $E^n|_{n=1 \text{ no } Z}$ appear in the location k.

In certain embodiments (embodiment 5) of the data storage system of the present invention which incorporate the features of embodiment 4, the resolution R of the alphabet is a function of the sequencing depth N by which reading the information stored in the data storage system is intended (there is a positive correlation between R and N). The resolution R of the alphabet may also be a function of the Inference Error iErr which is indicative of a desired probability of wrongly associating the observed probability vector $X^k$ to one of the alphabet letters $\sigma^k$ being read from the location k with a negative correlation between R and iErr.

To this end, it should be noted that in some cases the Inference Error iErr may be composed of:
- a synthesis error sErr indicative of a probability of incorrect synthesizing the encoded letter $\pi^k$ at the location k to match the correct letter $\sigma^k$ which is intended to be encoded at that location;
- a degradation error dErr indicative of a probability of a change introduced to the encoded letter $\pi^k$ due to degradation;
- a sequencing error sErr indicative of incorrect sequencing of molecule sequences which leads to incorrect inference of the encoded letter $\pi^k$ from the observed probability vector $\pi^k$; and
- a mapping error indicative of a probability of incorrect mapping of the observed probability vector $X^k$ to the encoded letter $\pi^k$ due to statistical deviations resulting from the finite sequencing depth N.

In certain embodiments (embodiment 6) of the data storage system of the present invention, which incorporate the features of above indicated embodiment 4 or 5, the mapping between an observed probability vector $X^k$ at the location k and the inferred alphabet letter $\pi^k$ is performed by determining an alphabet letter $\sigma^k$ satisfying a minimum divergence from the observed probability vector X, $\sigma^k = \text{ArgMin}[\{\sigma_m\}_{m=1 \text{ to } M}|D(\sigma_m, X^k)]$, where D is a divergence function.

In this connection, the divergence function $D(\sigma_m, X^k)$ may be for instance an LP distance function. Alternatively or additionally, the divergence function $D(\sigma_m, X^k)$ may be a Euclidean distance $D(\sigma_m, X^k) = \|\sigma_m - X^k\|$. Alternatively or additionally, the divergence function $D(\sigma_m, X^k)$ may be Kullack-Leibler divergence $D(\sigma_m, X^k) = KL(\sigma_m, X^k)$.

In certain embodiments (embodiment 7) of the data storage system of the present invention, which incorporate the features of any of the above indicated embodiments 1 to 6, the data storage system may include a plurality of populations of the molecular strands/sequences defining a respective plurality of data-blocks encoding data in the data storage system.

In certain embodiments (embodiment 8) of the data storage system of the present invention, which incorporate the features of embodiment 7, each molecular sequence of the molecular sequences includes a population identification segment which includes an identifying sequence of molecular building-blocks. The identifying sequence is indicative of the population with which the respective molecular sequence is associated, and is different in molecular sequences associated with different ones of the plurality of populations. In this regard, typically, although not necessarily, the molecular building-blocks of the identifying sequence may be for example selected from the same Z types of basic molecular building-blocks used in the data storing segment of the molecular strands.

In certain embodiments (embodiment 9) of the data storage system of the present invention, which incorporate the features of embodiment 8, a difference between identifying sequences that are used in population identification segments of different respective populations exceeds a predetermined threshold. In this regard the threshold may be for example measured by a certain predetermined distance metric of strings, such as an edit distance metric between strings.

In certain embodiments (embodiment 10) of the data storage system of the present invention, which incorporate the features of embodiment 8 or 9, the molecular sequences of one or more of said plurality of populations are contained together in a common region. To this end, molecular sequences associated with the same population can be exclusively selected by utilizing binding molecules configured and operable for selectively binding to the population identification segment of the molecular sequences associated with that same population.

In certain embodiments (embodiment 11) of the data storage system of the present invention, which incorporate the features of any of the above indicated embodiments 7 to 10, the data storage system includes a structure defining a plurality of distinct regions at which molecular sequences of different respective populations reside, respectively. For example, the molecular sequences of different respective populations may reside exclusively and respectively, at said distinct regions (this may be important particularly in cases where the molecular sequences have no population identification segment or other means to identify to which population they belong).

In certain embodiments (embodiment 12) of the data storage system of the present invention, which incorporate the features of any of the above indicated embodiments 1 to 11, the types of basic molecular building-blocks include A, C, G, and T nucleotides and/or chemical modifications thereof (e.g. modifications such as methylation). For instance the types of the basic molecular building-blocks/monomers may be constituted by the A, C, G, and T nucleotides (and/or the chemical modifications thereof). Alternatively or additionally the types of the basic molecular building-blocks/monomers may be constituted by the A, C, G, and T nucleotides (and/or their chemical modifications)), plus an additional one or more types of basic molecular building-blocks.

In certain embodiments (embodiment 13) of the data storage system of the present invention, which incorporate the features of any of the above indicated embodiments 1 to 12, the types of basic molecular building-blocks are predetermined oligomers (oligos) of the same length. More specifically, preferably basic molecular building-blocks are predetermined oligos of short length (e.g. short k-mers) whose length is in the range of 1 to 20 bases (e.g. specifically, they are nucleotide triplets, quadruplets).

In certain embodiments (embodiment 14) of the data storage system of the present invention, which incorporate the features of the above indicated embodiment 13, the length of the predetermined oligos is larger than 1 (e.g. specifically, they may be formed as doublets or triplets or quadruplets of bases/nucleotides).

Another broad aspect (embodiment 15) of the present invention is a method for storing data. The method includes:
providing at least one data-block for encoding data wherein the at least one data-block is formed by at least one respective population of molecular sequences (e.g. molecular strands), which comprise sequences (strings) comprising a number Z of different types of basic molecular building-blocks $\{E^n\}|_{n=1 \text{ to } Z}$, by which data of the data-block is encoded;
encoding the data of the data-block in a sequence $S' = (\pi^1, \pi^2, \ldots, \pi^k \ldots, \pi^{K-1}, \pi^K)$ of encoded letters $\{\pi^k\}$ belonging to an alphabet $\Sigma$, whereby an identity of a letter $\pi^k \in \Sigma$ encoded at a location k in the data-block is indicated by the types of basic molecular building-blocks occurring at the location k in a multitude of molecular sequences of the population;

The method is characterized in that the alphabet $\Sigma$ has a size M greater than said number Z of different types of basic molecular building-blocks used in the data storage system (M>Z), and each alphabet letter $\sigma_m$ in the alphabet $\Sigma \equiv \{\sigma_m\}|_{m=1 \text{ to } M}$ is defined by a vector $P_m^n$ indicative of a composition of the types of basic molecular building-blocks to which the alphabet letter $\sigma_m$ corresponds. The component $P_m^n$ in the vector is indicative of whether a basic molecular building-block $E^n$ of certain type n ($1 \leq n \leq Z$) should occur at a location k in one or more molecular sequences of the population in case the encoded letter $\pi^k$ at that location k, corresponds to the alphabet letter $\sigma_m$.

Typically for example, in case the component $P_m^n$ indicates that the basic molecular building-block $E^n$ occurs in the alphabet letter $\sigma_m$ this means that if the encoded letter $\pi^k$ at the location k matches the alphabet letter am, then the basic molecular building-block $E^n$ should occur at least in a certain minimal plurality of the molecular sequences of the population in order for it to have (be counted as having) statistical significance during reading.

In certain embodiments (embodiment 16) of the method for storing data according to the present invention, which incorporate the features of the above indicated embodiment 15, the vector $P_m^n$ defining each alphabet letter $\sigma_m$ in the alphabet $\Sigma$ is probability vector $\sigma_m \equiv \{P_m^n\}|_{n=1 \text{ to } Z}$ (or equivalently a frequency vector). To this end $P_m^n$ is indicative of the probability (e.g. or equivalently indicative of the frequency which is proportional to the inverse of the probability) of the appearance of basic molecular building-block of type n at location k in the molecular sequences of the population in case the encoded letter a at that location k, corresponds to the alphabet letter $\sigma_m$.

Yet another broad aspect (embodiment 17) of the present invention is a method reading data stored in a molecular data storage system (e.g. which is configured according to the present invention): the method includes:

(i) providing a molecular data storage system including a population of molecular sequences defining a data-block of the system, and in which the molecular sequences are formed with a number Z of different types of basic molecular building-blocks $\{E^n\}|_{n=1\ to\ Z}$, by which data of the data-block is encoded;

(ii) applying sequencing of N fold nominal sequencing depth to the population of molecular sequences to determine, per each location k out of 1 to K locations of storage segments of the molecular sequences of the population, to determine an observed probability vector indicative of $X^k=\{x^k(E^n)/N'\}|_{n=1\ to\ Z}$ whereby $x^k(E^n)$ is the number of times, out of an N' fold actual sequencing depth obtained for the population, at which a of type $E^n$ was found in the location k;

(iii) associating each observed probability vector $X^k$ with one of alphabet letters $\{\sigma_m\}$ of an alphabet $\Sigma \equiv \{\sigma_m\}|_{m=1\ to\ M}$.

As indicated above, also according to this aspect of the invention, the size of the alphabet $\Sigma$ is greater than the number Z of the different types of basic molecular building-blocks, $|\Sigma|>Z$. The letters $\{\sigma_m\}$ of the alphabet $\Sigma$ include composite letters, each composite letter being defined by a vector $\sigma_m \equiv \{P_m^n\}|_{n=1\ to\ Z}$ which includes two or more non-zero probabilities $P_m^n$ of two or more different respective types of the basic molecular building-blocks. Accordingly, said associating includes, per each of the locations k=1 to K, mapping the observed probability vector $X^k$ at the location k to one letter $\sigma^k \in \Sigma \equiv \{\sigma m\}|_{m=1\ to\ M}$ of the alphabet $\Sigma$. This may be achieved by determining the alphabet letter $\sigma^k$ whose vector satisfies a minimum divergences from the observed probability vector $X^k$, $\sigma^k = \text{ArgMin}[\{\sigma_m\}|_{m=1\ to\ M}|D\ (\sigma_m, X^k)]$, where D is a divergence function. Accordingly the method provides for determining a sequence $S''=\{\sigma^{nk}\}|_{k=1\ to\ K}$ of letters of the alphabet $\Sigma$, wherein the sequence is inferred from the molecular data storage system and is indicative of the data stored by the data-block.

In certain embodiments (embodiment 18) of the method for reading data according to the present invention, which incorporate the features of the above indicated embodiment 17, the vector $\{P_m^n\}_m$ defining each alphabet letter $\sigma_m$ in the alphabet $\Sigma$ is a probability vector and whereby $P_m^n$ designates the probability (e.g. or equivalently frequency or its inverse) of the appearance of basic molecular building-block of type n at location k in the molecular sequences of the population, in case the encoded letter $\pi^k$ at that location k, corresponds to the alphabet letter $\sigma_m$.

In certain embodiments (embodiment 19) of the method for reading data according to the present invention, which incorporate the features of the above indicated embodiments 18, the size $|\Sigma|$ of the alphabet, is given by $$M = |\Sigma| = \binom{R+Z-1}{R}$$

whereby Z is the number of distinct types of basic molecular building-blocks, and R is a resolution parameter indicative of an identifiable resolution of the probability (resolution of the content percentages) at which basic molecular building-blocks of a different types appear in each location of the monomer strings.

The resolution R may be for example defined as one over the minimum of probabilities $P_m^n$ of the basic molecular building-blocks appearing in the definition of the letters $\{\sigma_m\}_{m=1\ to\ M}$ of the alphabet $\Sigma$, such that $R \equiv 1/\text{Min}_{n,m1,m2}[(\text{Abs}(P_{m1}^n - P_{m2}^n))]$ for any type of basic molecular building-block is indexed $1 \leq n \leq Z$, and any pair of distinct letters $m1 \neq m2$.

In certain embodiments (embodiment 20) of the method for reading data according to the present invention, which incorporate the features of the above indicated embodiment 19, the sequencing depth N is set/adjusted as a function of the resolution parameter R of the data storage system.

In certain embodiments (embodiment 21) of the method for reading data according to the present invention, which incorporate the features of any of the above indicated embodiments 17 to 20, the divergence function D $(\sigma_m, X^k)$ may be for instance an LP distance function. Alternatively or additionally the divergence function D $(\sigma_m, X^k)$ may be a Euclidean distance D $(\sigma_m, X^k) = \|\sigma_m - X^k\|$. Alternatively or additionally, the divergence function D $(\sigma_m, X^k)$ may be Kullack-Leibler divergence D $(\sigma_m, X^k) = KL(\sigma_m, X^k)$.

In a further broad aspect (embodiment 22) of the present invention there is provided a data reader system adapted to read data stored in a molecular data storage system. The data reader system includes:

a) a sequencing control module configured and operable for connecting to a sequencing system for operating the sequencing system to sequence a population of molecular sequences with at least N fold nominal sequencing depths and determine an observed probability vector $X^k=\{x^k(E^n)/N\}|_{n=1\ to\ Z}$ per each location k out of 1 to K locations of storage segments of the molecular sequences of the population, whereby $x^k(E^n)$ in the observed probability vector $X^k$ is indicative of the number of times, out of the N fold sequencing depth, at which a basic molecular building-block of type $E^n$ was found in the location k, and b) a data inference processing module configured and operable to determine a sequence $\{\sigma^k\}|_{k=1\ to\ K}$ of letters of the alphabet $\Sigma$ being inferred from the population of molecular strands/sequences.

In certain embodiments (embodiment 23) of the data reader system of the present invention, which incorporate the features of the above indicated embodiment 22, the data reader system is configured and operable for implementing the method according to any one of the above indicated embodiments 17 to 21.

In certain embodiments (embodiment 24) of the data reader system of the present invention, which incorporate the features of the above indicated embodiment 22 or 23, the sequencing control module is adapted to apply sequencing of N fold nominal sequencing depth to the population of molecular sequences formed with a number Z of different types of basic molecular building-blocks $\{E^n\}|_{n=1\ to\ Z}$ and to determine, per each location k out of 1 to K locations of a storage segments of the molecular sequences of the population, an observed probability vector indicative of $X^k=\{x^k(E^n)/N'\}|_{n=1\ to\ Z}$ whereby $x^k(E^n)$ is the number of times, out of an N' fold actual sequencing depth obtained for the population, at which a basic molecular building-block of type $E^n$ was found in the location k. The data inference processing module is adapted for associating each observed probability vector $X^k$ with one of alphabet letters $\{\sigma_m\}$ of an alphabet $\{\sigma_m\}|_{m=1\ to\ M}$.

In yet a further broad aspect (embodiment 25) of the present invention, there is provided a method for fabricating (i.e. manufacturing) a molecular data storage system. The method includes:
  (a) providing a support substrate having one or more spatially separated regions at which one or more respective populations of molecular sequences can be synthesized;
  (b) providing one or more blocks of data to be respectively encoded by the one or more respective populations of molecular sequences which are to be synthesized at said one or more spatially separated regions respectively. The one or more blocks of data are coded by a sequence of letters $\{\sigma^k\}_{k=1}$ to of an alphabet $\Sigma \equiv \{\sigma_m\}|_{m=1\ to\ M}$ of size $|\Sigma|=M$, each letter $\sigma_m$ of the $\Sigma$ being defined by a probability vector $\sigma_m(P_m^n)|_{n=1\ to\ Z}|$;
  (c) per each block of data, synthesizing a corresponding population of molecular sequences at a respective region of said one or more regions:

According to the method, the molecular sequences of the population include strings/chains including a number Z<M of different types of basic molecular building-blocks $\{E^n\}|_{n=1\ to\ Z}$, by which the block of data is encoded. The synthesizing of the population of molecular sequences at the respective region includes synthesizing the sequences of letters $\{\sigma^k\}|_{k=1\ to\ K}$ of said block of data by: depositing, per each letter $\sigma^k$, a composition of basic molecular building-blocks $\{E_n\}|_{n=1\ to\ z}$ of said Z different types with relative concentrations $\{C(E_n)\}|_{n=1\ to\ Z}$ corresponding to the probability vector $\{P^{k,n}\}_{n=1\ to\ Z}$ of the respective letter $\sigma^k$.

In certain embodiments (embodiment 26) of the method for fabricating the molecular data storage system according to embodiment 25, the depositing includes:
  (a) providing said composition of basic molecular building-blocks with said relative concentrations, in which the basic molecular building-blocks are "blocked" from at least one end thereof to prevent their binding to one another;
  (b) placing said composition of basic molecular building-blocks at said respective region to thereby enable binding of said basic molecular building-blocks to molecules at said region;
  (c) washing said region to remove un-bonded basic molecular building-blocks of said composition; and
  (d) applying un-blocking treatment to "un-block" basic molecular building-blocks of said composition that are bounded to molecules at said region.

In certain embodiments (embodiment 27), the method for fabricating the molecular data storage system according to embodiment 25 or 26 further includes that the region of the support plate comprises cleavable molecules adapted to bind with said basic molecular building-blocks. Accordingly, the basic molecular building-blocks of the first composition that is being first deposited on that region, are bounded to the cleavable molecules.

Some embodiments (embodiment 28) of the method for fabricating the molecular data storage system, incorporate the features of the above indicated embodiment 27 or 26 and further include harvesting the population of molecules from the respective region by cleaving the cleavable molecules.

In some embodiments (embodiment 29) of the method for fabricating the molecular data storage system, which incorporate the features of any one of the above indicated embodiment 25 to 28, the synthesizing of the population of molecule sequences includes synthesizing similar population identification segments, in all molecule sequences of the population. The population identification segment of each molecular sequence is indicative of the population with which the molecular sequence is associated and is different in molecular sequences of different populations. For example the population identification segment of a molecular sequence may include a synthesized identifying sequence of the basic molecular building-blocks, which is indicative of the respective population with which the molecular sequence is associated.

In some embodiments (embodiment 30) of the method for fabricating the molecular data storage system, which incorporate the features of the above indicated embodiment 29, the difference between identifying sequences that are used in population identification segments of different respective populations, exceeds 3 in an edit distance metric.

In yet another broad aspect (embodiment 31) of the present invention, there is provided a molecular data storage fabrication/manufacturing system that is configured and operable for fabricating a molecular data storage structure according to the present invention. The fabrication system includes:
  (a) one or more containers adapted for containing said basic molecular building-blocks $\{E_n\}|_{n=1\ to\ Z}$ and/or mixtures thereof;
  (b) a fabrication head fluidly connected to said one or more containers and configured and operable for controlled deposition of a volume of basic molecular building-blocks contained in one or more selected containers out of said one or more containers; and
  (c) a control unit configured and operable to operate the fabrication head for providing at least one block of data to be encoded by synthesizing a respective population of molecular sequences encoding said block of data, on a region designated for carrying said population; and synthesizing the population of molecular sequences encoding said block of data at the designated region, by operating said fabrication head, at said designated region to sequentially deposit from said one or more containers volumes of basic building block molecules corresponding to the sequence of letters $\{\sigma^k\}|_{k=1\ to\ K}$ encoding said block of data.

The block of data provided by the control unit is coded by a sequence of encoded letters $\{\sigma^k\}|_{k=1\ to\ K}$ belonging to an alphabet F of size $|\Sigma|=M>Z$ comprising one or more letters $\Sigma \equiv \{\sigma_m\}|_{m=1\ to\ M}$. Each letter $\sigma_m$ in the alphabet is defined by a probability vector $\sigma_m = \{P_m^n\}|_{n=1\ to\ Z}|$ indicative of expected probabilities $\{P_m^n\}$ that basic molecular building-blocks of one or more respective types $\{En\}$ are synthesized at a designated location k in the molecular sequences at which the letter is encoded. The letters $\{\sigma_m\}|_{m=1\ to\ M}$ of the alphabet $\Sigma$ comprise one or more composite letters whose probability vectors $P_m^n$ include two or more probabilities having non-zero expected value. The composite letters are synthesized by depositing a mixture of types of basic building block molecules with concentrations matching the probability vector of the composite letter, obtained from one of the one or more containers.

It should be understood that the terms control unit/module and/or controller used herein may pertain to any type of control systems, digital or analogue, which may be implemented by any suitable circuitry and/or by software/firmware instructions executable by suitable computerized systems/circuits and/or by suitable analogue and/or digital hardware.

In some embodiments (embodiment 32) of the molecular data storage fabrication system incorporating the features of embodiment 31 above, the control unit is configured and operable for implementing operations (b) and (c) of the method of embodiment 25 above.

In some embodiments (embodiment 33) of the molecular data storage fabrication system incorporating the features of embodiment 31 or 32 above, is configured and operable for implementing the method of any one of the above indicated embodiments 25 to 30.

In some embodiments (embodiment 34) of the molecular data storage fabrication system incorporating the features of any one of embodiments 31 to 33 above, the one or more containers include L>Z containers. Z containers out of said L containers are adapted for separately containing different types of the Z types of basic molecular building-blocks $\{E_n\}|_{n=1\ to\ Z}$. The remaining L-Z containers are one or more mixture containers, and are adapted for containing one or more mixtures of two or more of said Z types of basic molecular building-blocks.

In some embodiments (embodiment 35) of the molecular data storage fabrication system, which incorporates the features embodiment 34, the letters $\{\sigma_m\}|_{m=1\ to\ M}$ of the alphabet $\Sigma$ further include up to Z simple letters, whose probability vectors $P_m^n$ include only one probability having a non-zero value. The fabrication head is fluidly connected to the L containers of the respective basic molecular building-blocks and is configured and operable for synthesizing each simple letter of the simple letters are by controlled deposition of a volume of basic molecular building-blocks obtained from a selected one of the L containers, which contains the basic molecular building-blocks of the type associated with that simple letter.

Some embodiments (embodiment 36) of the molecular data storage fabrication system, which incorporates the features of embodiment 34 or 35, also include a mixer module for preparing said one or more mixtures of two or more of the Z types of basic building block molecules. The mixture module is configured and operable for processing the probability vector of a composite letter, and preparing, in at least one of the one or more mixture containers, a mixture of basic building block molecules of the Z types with concentration ratios matching the probability vector of the composite letter. Some embodiments (embodiment 37) of the molecular data storage fabrication system, which incorporates the features embodiment 36, include one mixture container in which the mixer module is configured and operable for preparing on demand, different mixtures associated with different respective composite letters.

Some embodiments (embodiment 38) of the molecular data storage fabrication system, which incorporates the features of embodiment 36 or 37, include a plurality of mixture containers for containing different mixtures associated with different respective composite letters.

In some embodiments (embodiment 39) of the molecular data storage fabrication system, which incorporates the features of any one of the above indicated embodiments 31 to 38, the basic molecular building-blocks contained in the containers are "blocked" from one end thereof so as to prevent their binding to one another. The fabrication head is configured and operable for carrying out the following after deposition of basic molecular building-blocks of each letter at said region:
 (a) washing said region to remove un-bonded basic molecular building-blocks deposited at the region; and
 (b) applying un-blocking treatment to "un-block" the basic molecular building-blocks that are bounded to molecules at said region.

In some embodiments (embodiment 40) of the molecular data storage fabrication system, which incorporates the features of any one of the above indicated embodiments 31 to 39, the fabrication head is configured and operable for depositing cleavable molecules at the region at which synthesizing is to be performed (prior to said synthesizing operation).

Some embodiments (embodiment 41) of the molecular data storage fabrication system incorporating the features of embodiment 40 also include a harvesting module configured and operable for harvesting the population of molecules from that region by cleaving the cleavable molecules.

In some embodiments (embodiment 42) of the molecular data storage fabrication system, which incorporate the features of any one of the above indicated embodiments 31 to 41, the control unit is adapted for operating the fabrication head for synthesizing a similar identification segment for all molecules of the same population. The similar identification segment may for example include an identifying sequence of the Z types of basic building block molecules.

In some embodiments (embodiment 43) of the molecular data storage fabrication system, which incorporate the features of any one of the above indicated embodiments 31 to 42, the control unit is configured and operable for operating the fabrication head to synthesize a plurality of population of molecular sequences encoding data of a plurality of respective data blocks, at different spatially separated respective regions.

According to a further broad aspect of the present invention (embodiment 44) there is provided a molecular label (e.g. identifier, tag, marker) including a data storage system according configured according to any one of the above indicated embodiments 1 to 14. The molecular label includes at least one data-block that is being respectively encoded by at least one population of molecular sequences. For example the at least one data-block may define a unique label data segment that is indicative of an entity that is to be tagged using the population(s) of molecular sequences of the data storage.

With properly selected (suitable) molecular building blocks, the molecular label of the present invention may include tagging mixtures (populations) that can be used for tagging food, 3D printed products, synthetically manufactured implantation organs, building materials, airplane parts, and other mechanical parts.

In an embodiment (embodiment 45) of the molecular label incorporating the features embodiment 44, the molecular sequences in the data encoding population(s) may be protected and/or encapsulated against degradation, by any suitable technique as known in the art, for instance as described in U.S. Pat. No. 9,850,531.

BRIEF DESCRIPTION OF THE DRAWINGS

The patent or application file contains at least one drawing executed in color. Copies of this patent or patent application publication with color drawings will be provided by the Office upon request and payment of the necessary fee.

In order to better understand the subject matter that is disclosed herein and to exemplify how it may be carried out in practice, embodiments will now be described, by way of non-limiting example only, with reference to the accompanying drawings, in which:

FIG. 2 is a table exemplifying an alphabet definition for use for coding data in a molecular data storage according to an embodiment of the present invention;

FIGS. 4A to 4C, are block diagrams showing three types of molecular data storage systems according to various embodiments of the present invention;

FIG. 5 is a flow chart of a method for storing data according to an embodiment of the present invention;

FIGS. 8A and 8B show together a flow chart of a method 400 for reading data stored in a molecular data storage system 100 according to an embodiment of the present invention;

FIG. 10 is a flow chart of a method for fabricating a molecular data storage system 100 according to an embodiment of the present invention;

DETAILED DESCRIPTION OF EMBODIMENTS

Figure 1:
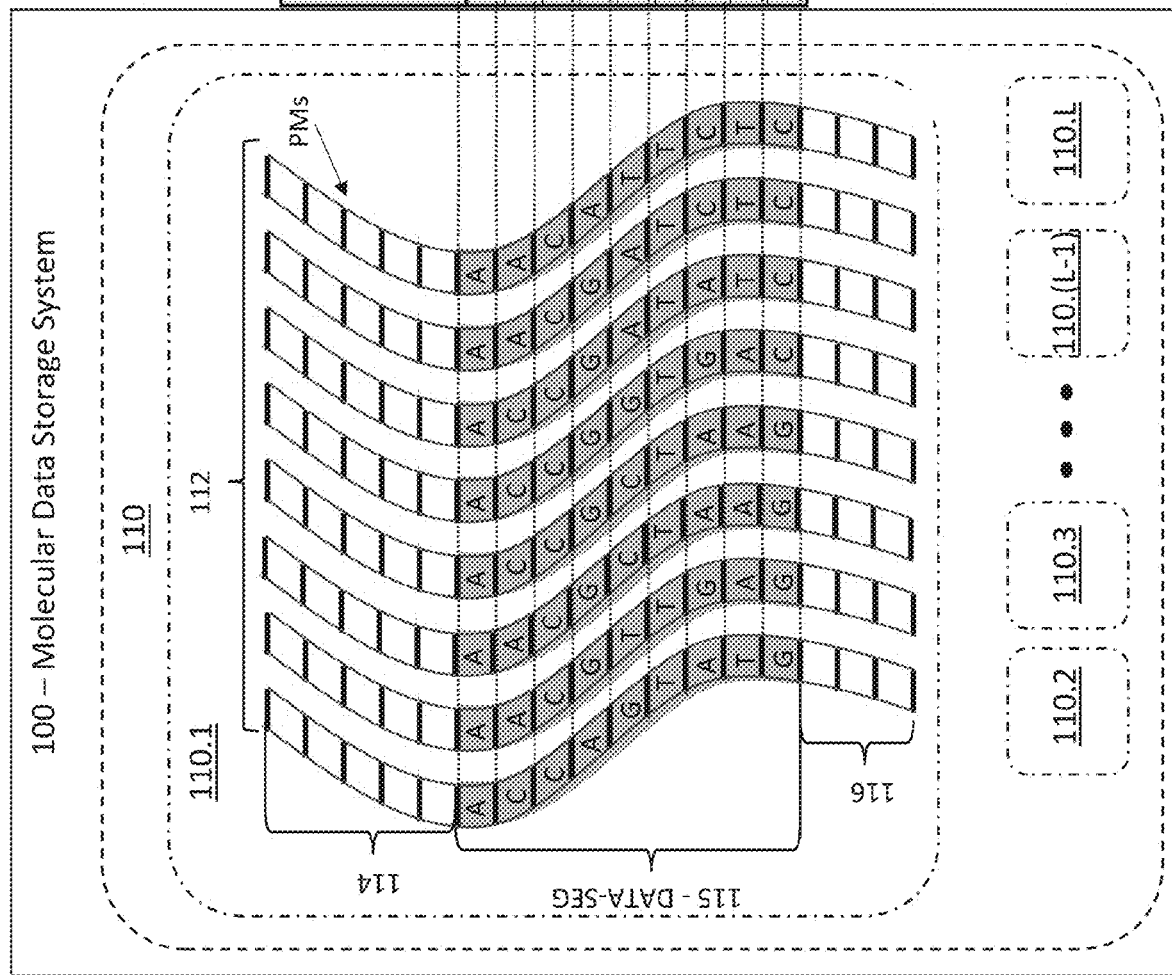
FIG. 1 is a block diagram of a data storage system 100 according to an embodiment of the present invention.

Reference is made to FIG. 1 illustrating a block diagram of a data storage system 100 according to an embodiment of the present invention. The system 100 includes one or more data-blocks 110, whereby the term data-block is used herein to define physical element(s) encoding a block of data. Each data block, e.g. 110.1, includes a population 112 (e.g. group/collection) of molecular strands/sequences PMs by which the data of the data-block is encoded/stored. In other words, each population of molecular strands in the data storage system 100, defines a respective data-block for encoding data in the data storage system 100. In the present example there is shown data-block 110.1 with its respective population 112, and additional optional data-blocks 110.2 to 110.L with their respective populations of molecules (not specifically shown in the figure). It should be appreciated, as exemplified below, that in various embodiments of the present invention the populations of molecules of different data-blocks 110 may be located spatially separately, or the molecules of different populations may be co-located in a mixture (in the latter case, other mechanisms are provided to distinguish between molecules of different populations, as described below).

One of the data blocks, data-block 110.1 of the data storage system 100 will now be described in more detail. The data-block 110.1 includes the population 112 of molecular strands/sequences PMs, by which the data stored by the data block is encoded. Generally, the molecular strands/sequences PMs include strings of basic molecular building-blocks formed with a number Z of different types of the basic molecular building-blocks $\{E^n\}_{n=1\ to\ Z}$ (where $E^n$ is indicative of a type of the basic molecular building-block and n is an index running from 1 to Z for the different types participating in the data storage). The data of the data-block 110.1 is encoded by the sequences of basic molecular building-blocks in the molecular strands/sequences PMs of the data-block 110.1. In some implementations the data of the data-block 110.1 is encoded in an ordered sequence $S=(\pi^1, \pi^2, \ldots, \pi^k \ldots, \pi^{K-1}, \pi^K)$ of letters $\{\pi^k\}$ encoded in the population 112 of molecular strands/sequences PMs. The encoded letters $\{\pi^k\}$ are generally associated with, or belong to, an alphabet $\Sigma$ that is used for encoding the data.

The encoded letters $\{\pi^k\}$ are encoded by the order of the Z types of basic molecular building-blocks $\{E^n\}|_{n=1\ to\ Z}$ arranged at least in parts of the molecular strings/strands/sequences PMs of the population 112. Nonetheless, according to the technique of the present invention, the size $M=|\Sigma|$ of the alphabet $\Sigma$ (namely number of distinct letters therein) is greater that the number Z of different types of basic molecular building-blocks that are used/included in the molecular strands/sequences PMs, (M>Z).

This is achieved by exploiting the redundancy of molecular strands/sequences PMs in the population 112, to define the letters in the alphabet $\Sigma$ in statistical terms indicating probabilities of existence of each of the Z types of basic molecular building-blocks in the letter. In this manner, the number of M of different letters which are defined in the alphabet $\Sigma$ may be higher than the number Z of basic molecular building-block types.

In other words, according to the present invention, a letter $\sigma_m$ in the alphabet $\Sigma \equiv \{\sigma_m\}|_{m=1\ to\ M}$ can be represented (or is defined) by a probability vector $\sigma_m \equiv \{P_m^n\}_{n=1\ to\ Z}$. The probability $P_m^n$ indicates the probability that a basic molecular building-block of type $E^n$ (n being the index of the type running from to Z ($1 \leq n \leq Z$)) appears at a certain location (e.g. indexed k) along the molecular strands/sequences PMs of a population 112 in case the respective letter $\sigma_m$ is encoded in that location.

Generally, when considering the letters definition in terms of the probability vector $\sigma_m \equiv \{P_m^n\}$ then the sum of probabilities of each letter's $\sigma_m$ definition should equal one, $\Sigma_{n=1\ to\ Z}(P_m^n)=1$. However, although defining the letters in terms of probabilities may be convenient, it should be understood that alternatively or additionally, the composite letters may be equivalently defined by a frequency vector indicative of the respective frequencies/concentrations ($C_m^n$) at which each type of basic molecular building-block, indexed n, appears in the letter $\sigma_m$ (m being the index of the letter). In such an equivalent definition, the sum of the frequencies/concentration may not necessarily be equal to one. To this end, the probability vector may be considered as a normalized version of the frequencies/concentrations ($C_m^n$).

Conventional molecular storage techniques (e.g. such as disclosed in [1]-[3], [6]), encode the data using an alphabet whose size is equal to or smaller than the number of types of monomers/building blocks of the molecular sequences. In other words, in such conventional techniques there is one-to-one correspondence between the alphabet letters and the types of monomers.

Indeed, this type of alphabet letters, as used in conventional techniques, which correspond exclusively to a single type of monomer, may also optionally, but not necessarily, be used in the technique of the present invention and are referred to in the following as Simple Letters.

In the notation used in the present application, where an alphabet letter $\sigma_m$ is designated by the probability vector of $\sigma_m \equiv \{P_m^n\}|_{n=1 \text{ to } Z}$, the letter $\sigma_m$ may be regarded as a Simple Letter if its probability vectors $\{P_m^n\}$ include only one probability having non-zero expected value, e.g. $P_m^n=1$ only for the index n corresponding to one certain type of basic molecular building-block n=z' and $P_m^n=0$ for all other indices n≠z'.

However, as indicated above, according to the present invention, the number M of letters in the alphabet $\Sigma$ is greater than the number Z of building-block types and there is no one-to-one correspondence between letters and building-block types. This is achieved by utilizing letters which are referred to herein as Composite Letters. In Composite Letters the probability vectors $\{P_m^n\}$ include two or more non zero probabilities, i.e., $P_m^n>0$ for indices n corresponding to at least two types of basic molecular building-blocks n=z', n=z'', z'≠z''. In other words, a composite letter may be considered as any letter $\sigma_m$ corresponding to a vector, which is not a simple letter vector, or yet, alternatively, a composite letter $\sigma_m$ may be defined as a letter whose probability vector components $P_m^n<1$ for all building-block types $1\leq n \leq Z$, m being the fixed index of the letter.

Thus, according to the present invention, the alphabet $\Sigma$ includes: (i) up to Z simple letters (where Z is the number of different types of basic building block molecules participating in the encoding of data in the molecular population(s) of the system); and (ii) one or more composite letters whose probability vectors are $P_m^n$.

Turning now to FIG. 2, there is provided a table, Table 2, exemplifying a definition of an alphabet $\Sigma$ according to an embodiment of the present invention, which is constructed based on Z=4 different basic building-block types: $\{E^n\}_{n=1 \text{ to } Z=4} \equiv \{A, C, G, T\}$ (e.g. where A, C, G, and T stand for the Adenine, Cytosine, Guanine, and Thymine monomers of the DNA). Each line in the table represents the probability vector of a letter am in the alphabet $\Sigma$. As shown in this example, the letters $\sigma_1$, $\sigma_{21}$, $\sigma_{31}$ and $\sigma_{35}$ are simple letters corresponding respectively to the types (nucleotides) A, C, G, and T (this is evident from the probabilities $P_m^n$ in the vector of each letter which include a single 100% probability (namely 1) for one of the building-block types to appear in the respective position in which the letter is encoded in the molecular strands/sequences PMs of the population 112, while the probabilities of other building-block types is zero.

Except for letters $\sigma_1$, $\sigma_{21}$, $\sigma_{31}$ and $\sigma_{35}$, which are simple letters, the rest of the 35 letters in the exemplified alphabet $\Sigma$ are composite letters, whose probability vectors include probabilities that two or more different types of the A, C, G, and T monomers (nucleotides) appear in the respective position in which the letter is encoded in the molecular strings/strands/sequences PMs of the population 112.

A resolution R of the alphabet $\Sigma$ and/or of its individual letters, is an important parameter by which the size $M=|\Sigma|$ (number of letters) of an alphabet $\Sigma$ constructed from a given number Z of building-block types $\{E^n\}_{n=1 \text{ to } Z}$, may be determined. The resolution R parameter is defined as one over the minimally allowed absolute difference between probabilities of the same building-block type appearing in the definition of two arbitrary letters in the alphabet $\Sigma$. Namely, $R \equiv 1/\text{Min}_{n,m1,m2}(\text{Abs}(P_{m1}^n - P_{m2}^n))]$ for any type n of the Z building-block types $1 \leq n \leq Z$ and any pair of distinct letters m1≠m2; $1 \leq m1, m2 \leq M$. To this end, in other words, the resolution parameter R represents the difference between distinct values that each probability component $P_m^n$ in the vectors defining the alphabet letters $\{\sigma_m\}$ can acquire for given type n. As will be described below, the resolution parameter can be actually determined based on various error rates expected during the writing (synthesizing) and reading (sequencing) of the data storage 100, degradation related errors, and the error correction codes included in data and acceptable error probabilities.

Considering a given resolution parameter R, the maximal size/number-of-letters in the alphabet $\Sigma$ is given by $$M = |\Sigma| = \binom{R+Z-1}{R}$$

whereby R is the resolution parameter and Z is the number of distinct types of basic molecular building-blocks. This is because the number of possibilities of different letters is in this case equivalent to the combinatorial number of unordered combinations with repetitions for selecting (in the vectors defining the letters) a total number R of monomers from the Z types. To this end, for the alphabet $\Sigma$ exemplified in FIG. 2 the resolution parameter is R=4 (as is evident from the fact that the minimal difference between probabilities per each building-block type in the table is 25%), and thus the number of letters (simple plus composite) in the alphabet $\Sigma$ is given by $$M = |\Sigma| = \binom{R+Z-1}{R} = \binom{7}{4} = \frac{7!}{4! * 3!} = 35,$$

considering that the number of building-block types is Z=4.

It should be understood that the types of molecular strands/sequences PMs used in the data storage system 100, and the building-blocks types used therein, may differ from implementation to implementation of the system depending on various prerequisites required from the data storage system. For instance, as exemplified above and in the following, the molecular strands/sequences PMs may be bio-polymers, such as nucleic acid, DNA or RNA, which are poly-nucleotide molecules constructed with Adenine, Cytosine, Guanine, and Thymine nucleotides (A,C,G,T) as building-blocks/monomers (DNA), or with Adenine, Cytosine, Guanine, and Uracil nucleotides (A,C,G,U) as building-blocks/monomers (RNA). In other instances, the molecular strands/sequences PMs may include other polymers types, bio-polymers or not, with any number Z>1 of monomer/building-block types as permitted by the chemistry of the type of polymers used. To this end, data storage system 100 of the present invention may be implemented with the building-block types including or consisting of the A, C, G, and T nucleotides, and/or the A, C, G, and U nucleotides, or with these nucleotides plus additional one or more building-block types, or with different sets of basic molecular building-block types, being e.g. bio-type monomers and/or other, e.g. synthetic[7], monomers.

Turning back to FIG. 1, data storing sections/segments 115 of the molecular sequences/strands/strings PMs (e.g. monomer strings) in the population 112 are shown together with indications to the types of basic molecular building blocks arranged in those molecular sequences. The A, C, G, and T nucleotides are used to exemplify Z=4 types of basic molecular building-blocks, by which the molecular strands/sequences PMs of the data storage are constructed in this non-limiting example. It should be understood, and as is also exemplified, that not necessarily the entire monomer strings PMs (the entire lengths of the molecular strands/sequences) are exploited for encoding the data which is stored by the data storage. For instance, in this example only sections 115 of the molecular strands/sequences PMs are used to encode data, while other sections, of the molecular strands/sequences PMs, for instance sections 114 and 116, are non-data encoding sections. Indeed, these sections may be used for other purposes, such as population identification sections, as described below, or they may be non-usable sections.

It should be noted that the phrases molecular strand, molecular sequence as well as polymer molecule, are used herein to indicate molecules composed of at least one chain of many building-blocks (i.e. being the basic subunits of the molecule, which are referred to herein as monomers). In the molecular strand/sequence, the basic molecular building-blocks/monomers are arranged in a chain/string, which may be a simple linear chain (with no branches), or a branched chain which includes one or more branch points at which the chain/string of building-blocks/monomers is split into several strings. In any case, for clarity, each molecular strand/sequence is considered herein to include a chain/string/sequence of building-blocks/monomers. It should be also understood that the term section, used herein in relation to a part of the monomer string/chain, should not be considered necessarily as a continuous section of the string/chain, but may be considered to be a set of predetermined locations $\{k\}$, adjacent or not, along the chain/string of monomers of the molecular strands/sequences, which serve a designated purpose. For instance, the data encoding sections 115, are sections which indicate how monomer/building-blocks constituents (in different locations $\{k\}$ thereof) are used to encode the data stored by the system 100. Such sections 115, as well as other sections (e.g. 114 and 116) are illustrated for clarity in the figure as continuous, however, it should be understood that they are not necessarily continuous, but merely represent sets of predetermined locations along each of the molecular strands/sequences PMs of the population 112.

Table 1 in FIG. 1 shows the data, being the sequence of encoded letters $S=(\pi^1, \pi^2, \ldots, \pi^k \ldots, \pi^{K-1}, \pi^K)$, which are encoded in locations k from 1 to 9 of the data storage sections 112 of the molecular strands/sequences PMs of the population 112 of data-block 110.1 of the molecular data storage system 100. As indicated above, the locations k may not be consecutive or even adjacent locations in the molecular strands/sequences PMs although for clarity they are represented as such in this non-limiting example of FIG. 1. The alphabet $\Sigma$ used for inferring the encoded letters $\{\pi\}<_{1 \leq k \leq 9}$ encoded by the data sections 115 of the molecular strands/sequences PMs of the population 112 is the alphabet $\Sigma$ shown in the Table 2 of FIG. 2. The correspondence between each encoded letter $\pi_k$, (which is encoded in one of the locations $1 \leq k \leq 9$ in this example), and its associated one of the alphabet letters $\{\sigma_m\}$ is shown in Table 1 of FIG. 1. The association/mapping of each encoded letter $\pi_k$ to its respective associated alphabet letter $\{\pi_m\}$, to which it pertains, is determined based on the statistical composition $\{C(E_n)\}^k_{n=1 \text{ to } Z}$ of types of the basic building-blocks/monomers appearing in the respective location k of the encoded letter in the data encoding sections 115 of the molecular strands/sequences PMs of the population 112, and the correspondence between this statistical composition $\{C(E_n)\}^k_{n=1 \text{ to } Z}$ and the probability vector $\{P_m^n\}_{n=1 \text{ to } Z}$ defining the respective letter $\sigma_m$. More specifically, according to some embodiments, as will be described in more detail below, the alphabet letter $\sigma^k$ that corresponds to an encoded letter $\pi_k$ is the one of the alphabet letters $\{\sigma_m\}$ for which a predetermined divergence function $D(\sigma_m, X^k)$ from the normalized statistical composition $\{C(E_n)\}^k_{n=1 \text{ to } Z}$ found in the location k, is minimized. Namely, $\pi_k \rightarrow \sigma^k$ that satisfies $\sigma^k = \text{ArgMin}|_{1 \leq m \leq M} [D (\sigma_m \equiv \{P_m^n\}_{n=1 \text{ to } Z}, \pi_k \equiv \{C(E_n)\}^k_{n=1 \text{ to } Z}/\Sigma_{n=1 \text{ to } Z} (C^k_n (E_n))]$; where: $D(\sigma_m, \pi_k)$ is a divergence function such as a distance function, $\sigma_m \equiv \{P_m^n\}_{n=1 \text{ to } Z}$ is the alphabet letter defined by the probability vector, and nu is the encoded letter defined by the normalized statistical frequencies of the different building-block types observed in the locations k of the plurality of molecular strands/sequences in the population that is read for this segment.

For example, the encoded letter $\pi_1$ in FIG. 1 corresponds to the alphabet letter $\sigma_1$ in Table 2 in FIG. 2, since the statistical/relative concentration of the building-block type A in the location k=1 in the population 112 is 100% (since 8 out of the 8 molecules shown in the population 112 include the building-block type A in the location k=1), similar to that required in the probability vector of $\sigma_1$ (see Table 2). Accordingly, the encoded letter $\pi_2$ in FIG. 1 corresponds to the alphabet letter $\sigma_5$ in Table 2 in FIG. 2, since the statistical/relative concentrations of the building-block types A and C in the location k=2 in the population 112 are respectively 50% and 50% (since 4 out of the 8 molecules of the population 112 include the building-block type A in the location k=2 and the other 4 out of 8 molecules of the population 112 include the building-block type C), which is similar to the probability vector defining the alphabet letter $\sigma_5$ (see Table 2). Accordingly, the correspondence of the rest of the encoded letters in Table 1 with the alphabet letters $\{\sigma_m\}$ of Table 2 can be verified.

It should be understood that the example of FIG. 1 shows an "ideal" (e.g. non-defective) population 112 of molecular strands/sequences PMs in which no errors (statistical or others) were introduced during synthesizing of the molecular strands/sequences PMs, or due to degradation. Accordingly, there exists a perfect match between the encoded letters $\{\pi\}$ and the respective alphabet letters corresponding thereto. However, as will be appreciated by those versed in the art of polymer synthesis, and as also described below, there may be various sources of errors in such population 112 of molecular strands/sequences PMs, so there may exist some distance/deviation between the encoded letters $\{\pi\}$ and the ideal/perfect alphabet letters $\{\sigma_m\}$. In some embodiments of the present invention, as described below, specifically selected divergence/distance functions are used/minimized in order to map the encoded letters $\{\pi\}$ to their respective letters, while mitigating/reducing the various statistical inference errors associated with the limited sampling size (limited sequencing depths, and/or possibly also mitigating synthesis, degradation and sequencing errors).

It should be noted that in some embodiments of the present invention the data storage system 100 may be configured and operable for storing large amounts of data and may include a large number of data blocks (populations).

Alternatively or additionally, in some embodiments the data storage system 100 may be configured and operable for use as a molecular mark/label or tag (e.g. marker/tag) which can be applied on or within an object which is to be marked/labeled, and/or optionally embedded within the material constituting the object, for labeling the object and for enabling its identification or verification. In this case the data storage system 100 may include at least one data-block (e.g. as few as one population of molecular sequences), by which the marking data indicative of the molecular mark is encoded. In some embodiments the molecular tag or label further includes, in addition to the data storage system 100, also additional constituent materials selected/designed for embedding and/or binding the molecular mark on an object in a designated way. The additional constituent materials may include for instance material that encapsulates the coding material and protects it against degradation as is described in U.S. Pat. No. 9,850,531. It should be emphasized that this invention provides for using composite encoding within such tagging systems, enabling more tagging flexibility.

As also shown in FIG. 1, the data storage system 100 may include a plurality of populations of the molecular strands/sequences defining a respective plurality 110 of data-blocks encoding data in the data storage system 100. For example, in each data-block/population there may be typically (e.g. using current controlled polymer synthesis technologies) in the order of $10^5$ to $10^8$ molecular strands/sequences PMs. The usable length for storing data in the molecular strands/sequences (i.e. the lengths of the data segment DATA-SEG) may be in the order/range of about L=50 to 1000 monomers/building-blocks, when considering the present techniques and technologies for controlled polymer synthesis. Accordingly, considering alphabet of size M, data capacity of about $$DC = \left\lfloor \frac{L}{\log_M(2)} \right\rfloor \text{bits} = \left\lfloor \frac{L/8}{\log_M(2)} \right\rfloor \text{bytes},$$

where L is the PM length (e.g. in the order of 50 to 1000 building-blocks as said above) can be stored by each such population. Thus, typically, in most cases, a plurality of such populations/data-blocks 110 are included in the data storage.

Indeed, in some implementations, the data storage is configured such that the different populations (112) of molecules, which are associated with different data-blocks 110, reside at different physical regions/places, and can thus be distinguishable based on their region. For instance, the populations may be stored in separate regions of a matrix/plate carrier or on different containers, such that molecules of different populations (112) can be separately read/sequenced from the different locations.

Figure 3:
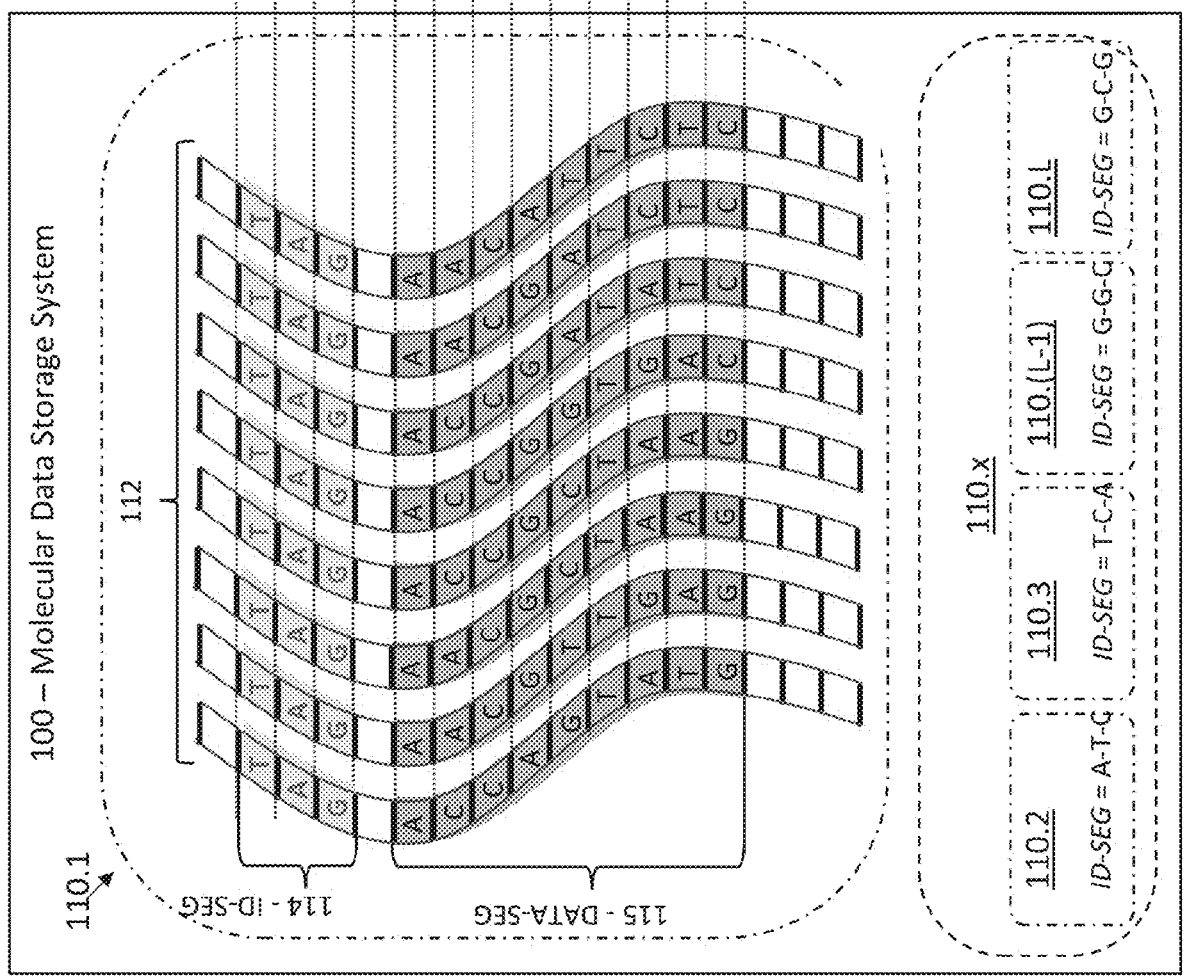
FIG. 3 is a block diagram of a data storage system 100 according to another embodiment of the present invention in which the molecular strands/sequences of each population include an identification segment/sequence identifying the population to which they belong.

Alternatively, or additionally, as shown in FIG. 3, the building-blocks strings/chains of the molecular strands/sequences may include respective population identification segments/sections ID-SEG (114) which include an identifying sequence of building-block types (e.g. selected from the Z types $\{E_n\}_{n=1\ to\ Z}$, or possibly from another set of building-block types). As shown in FIG. 3 the molecular strands/sequences include data encoding segments/section DATA-SEG (115), which is configured similarly to that described above with reference to FIG. 1, and also includes a respective population identification segments/sections ID-SEG (114) identifying the population 112 to which they belong. The identifying sequence ID-SEG in the population identification segment 114 of each of the molecular strands/sequences PMs is indicative of the population 112, with which the respective molecular strand/sequence is associated, and is different in molecular strands/sequences of different data-blocks 110 (i.e. is different in molecular strands/sequences of different ones of said plurality of populations associated with the different data-blocks 110). It should be noted that the population identification segments ID-SEG (114) are not coded using the statistical/composite letters of the alphabet Σ (as the encoding in the data segments/sections DATA-SEG (115)), but are rather coded only using simple letters (not statistical/composite letters), each corresponding respectively to a single specific monomer type. Accordingly, identification segments of the same ID are similar in all the molecules marked thereby. In other words, the population identification segments, which are unique identifiers of the respective population 112 are encoded by a fixed sequence/order set of building-blocks/monomers (e.g. typically consecutive ordered set—namely sequences, but not necessarily), which identifies the respective population. It should be understood that also more than one different ordered set/sequence of building-blocks/monomers may be used to identify molecules that are associated with same populations, however each population should be identified by an ordered set/sequence of building-blocks which is different from any other ordered sets/sequences of building-blocks which are used for identifying any other populations (otherwise the populations might not be distinguishable based on the ID-SEG (114)).

As shown, in the present example of FIG. 3, the population 112 which belongs/encodes data of the data-block 110.1, is marked/identified by the ordered set/sequence of the monomers T-A-G in the identification segment ID-SEG (114) of the molecular strands/sequences PMs. Accordingly, utilizing specifically designed binding molecules, the molecular strands/sequences PMs of the population 112 may be exclusively extracted from a collection/mixture of molecular strands/sequences PMs of several data-blocks 110 (of several populations {112}) and separately sequenced to read/infer the data of the respective data-block 110.1 to which they belong.

It should be noted in some embodiments, e.g. particularly in case where the molecular strands/sequences are composed of A,C,G,T monomers, the identification segments can be located at the so called 5p-end of the molecules, or at the so called 3p-end of the molecules, or, generally they may also be located anywhere else along the monomer/building-block strings/sequences of the molecules. In some particular implementations/embodiments of the invention, it may be preferable to locate the identification segments on the 5p-end of the synthesized molecules. This is because the quality of synthesized polymer tends to be higher at the 5p-end of the molecule.

Table 3 in FIG. 3 shows the correspondence of the encoded sequences in the data and ID segments to the alphabet letters of Table 2 in FIG. 2. As shown, the data segment DATA-SEG (115) encodes the same data as that illustrated in the system of FIG. 1, while utilizing both simple and composite letters of the alphabet in order to reach/improve/maximize the data density. The ID-SEG (114) is coded by utilizing only simple letters, so that the ID-SEG (114) of each individual molecule can be used to indicate/identify the population with which the individual molecule is associated (i.e. the population to which the individual molecule belongs).

It should be noted that in some embodiments of the present invention the molecular strands/sequences PMs of different populations/data-blocks 110 are configured/synthesized such that the identifying sequences ID-SEG (114) which identify different ones of the populations/data-blocks 110 differ from one another by a difference exceeding a certain predetermined threshold. More specifically, in some embodiments of the present invention, the molecular data storage 100 may be configured such that each two different identification sequences/segments of building-block/monomers which are used for identifying molecular strands/sequences of different populations/data-blocks differ from one another by at least a certain predetermined distance threshold measured on a certain preselected distance metric of strings. For example, the certain distance metric of strings used may be the so called edit distance (as generally known in the art), and the minimal threshold edit distance between different identification sequences/segments may be, in some cases, at least 3 edit operations measured in the edit distance metric. Using the certain minimal distance (e.g. 3) may be preferable because the mapping of the letters in the population to the composite alphabet depends on identifying every molecule as a member of the correct population.

Turning now together to FIGS. 4A to 4C, these are block diagrams showing three types of molecular data storage systems according to various embodiments of the present invention. Systems 100A, 100B shown in FIGS. 4A and 4B, are two types of molecular data storage systems according to two embodiments of the present invention, in which the molecular strands/sequences of different populations are contained together, and separately, respectively; and system 100 shown in FIG. 4C is a generalized/generic system type whose configurations are combinations of the configurations shown in systems 100A 100B (namely some of the populations may reside together, e.g. in a mixture, while others may reside separately).

In the molecular data storage systems type A, 100A, shown in FIG. 4A, a plurality of L data-blocks 110.1, 110.2 . . . 110.L, include respective populations of molecules with respective data segments DATA-SEG.1, DATA-SEG.2 . . . DATA-SEG.L by which the data is encoded utilizing an alphabet Σ with composite letters, such as that exemplified in the Table 2 of FIG. 2.

In the molecular data storage systems type A, 100A, shown in FIG. 4A, molecular strands/sequences of the plurality of populations/data-blocks 110.1, 110.2 . . . 110.L are contained together in a common containing region 105. The molecular strands/sequences of each population/data-block, include the similar identification segment, e.g. molecules of data-block 110.1 are identified-by/include the unique id segment ID-SEG.1, molecules of data-block 110.2 are identified-by/include the unique id segment ID-SEG.2 and so forth, molecules of data-block 110.L are identified-by/include the unique id segment ID-SEG.L (the id segments differ from one another ID-SEG.1≠ID-SEG.2≠ . . . ≠ID-SEG.L). To this end, molecular strands/sequences PMs associated with the same population, can be exclusively selected by utilizing binding molecules configured and operable for selectively binding to the population identification segment of the molecular strand/sequence of the same population.

In the molecular data storage systems type B, 100B, shown in FIG. 4B, molecular strands/sequences of the plurality of populations/data-blocks 110.1, 110.2 . . . 110.L are contained/reside separately, in spatially separated respective regions 105.1, 105.2 . . . 105.L. In this case, the unique id segments ID-SEG.1, ID-SEG.2 . . . II-SEG.L are only optional and may be obviated from the molecular strands/sequences since the molecular strands/sequences of different populations may be distinguishable based on the spatial location in the data storage 100B. To this end, the molecular data storage systems type B, 100B, may include a structure of a plurality of distinct regions 105.1, 105.2 . . . 105.L at which molecular strands/sequences of different respective populations reside respectively.

The general molecular data storage system 100 shown in FIG. 4C, combines the techniques of the molecular data storage systems types 100A and 100B, and may thus include some populations/data-blocks whose molecular strands/sequences are spatially separated as in type B systems (thus not necessitating identification segments in these molecules), and may also include some populations/data-blocks whose molecular strands/sequences are co-located at the same regions and thus have different identification segments which enable to distinguish between molecules of the different populations that reside together.

Reference is now made to FIG. 5 showing a flow chart of a method 200 for storing data according to an embodiment of the present invention. The method 200 may be implemented in conjunction with the molecular data storage system 100 described above of the present invention. The method includes the following:

In 210 data of at least one data-block (e.g. 110.1) to be stored by the system, is provided. The data is designated to be encoded by a respective population (e.g. 112) of molecular strands/sequences PMs that are formed with a number Z of different building-block types $\{E^n\}_{n=1 \text{ to } Z}$. In 220 the data of the data-block 110.1 is processed for presenting it as data sequence $S=(\sigma^1, \sigma^2, \ldots, \pi^k \ldots, \sigma^{K-1}, \sigma^K)$ of letters of the alphabet $\Sigma \equiv \{\sigma_m\}|_{m=1 \text{ to } M}$ which is used according to the present invention, as described above (namely the alphabet Σ having the size M≡|Σ|>Z and/or the alphabet s including the composite letters, as those which are defined above). To this end, utilizing such alphabet Σ, the sequence representing the data is generally shorter than the length of a required sequence, in which conventional techniques, whose alphabet is based on the types of monomers themselves, as letters. This is because the numeral-basis of the alphabet Σ of the present invention is the size M which is greater than the numeral-basis of a conventional alphabet, whose size is the number Z of monomer types used in the molecular data storage.

230 includes the data sequence $S=(\sigma^1, \sigma^2, \ldots, \pi^k \ldots, \sigma^{K-1}, \sigma^K)$ of the data-block 110.1 being encoded in sequence S' of encoded letters $S'=(\pi^1, \pi^2, \ldots, \pi^k \ldots, \pi^{K-1}, \pi^K)$ in the population 112 molecular strands/sequences PMs formed with the types $\{E_n\}_{n=1 \text{ to } Z}$ of basic molecular building-blocks. To achieve this, optionally in 232 the alphabet Y (e.g. such as that represented in FIG. 2) is provided with M>Z alphabet letters $\{\sigma_m\}$ whereby the letters $\{\sigma_m\}$ are defined by respective probability vectors $\sigma_m = \{P_m^n\}_{n=1 \text{ to } Z}$ indicative of relative amounts (statistical concentrations) of the Z types of building-blocks/monomers in each letter. In 234, the sequences of encoded letters $S'=(\pi^1, \pi^2, \ldots, \pi^k \ldots, \pi^{K-1}, \pi^K)$ is such that each encoded letter $\pi^k$ at location k of the sequence S' is formed/corresponds-to/is indicated by the relative amounts/concentrations $\{C(E_n)\}_{n=1 \text{ to } Z}$ of building-blocks of the different types that exist at certain locations corresponding to k along the building-blocks strings of the plurality of molecular strands/sequences of the population 112. The encoded letter $\pi^k$ corresponds to a respective alphabet letter $\sigma^k \in \Sigma$ for which the probability vector $\{P^{k,n}\}$ corresponds to the amounts/concentrations $\{C(E_n)\}_{n=1 \text{ to } Z}$ of the different types of building-blocks. Thus according to the method 200 (see 236 in the figure) each encoded letter $\pi^k$ in the molecular strands/sequences PMs corresponds to a respective alphabet letter $\sigma^k \in \Sigma$ for which the probability vector $\{P^{k,n}\}$ corresponds to the amounts/concentrations $\{C(E_n)\}_{n=1 \text{ to } Z}$ of the different types of building-blocks.

Optionally, as shown in 240, each of the molecular strands/sequences of the population 112 pm, is an identifying sequence of building-blocks (e.g. selected from the Z types). The identifying sequence may serve as a unique identifier of the data-block whose data is encoded in the population 112.

Optionally, as shown in 250, a plurality of data blocks with respective data are encoded/formed by repeating 210 to 240 to provide a respective plurality of populations that encode the corresponding data of the plurality of data blocks. As indicated in 252 the different populations may be located at different regions to enable to distinguish between molecules of different populations. Alternatively or additionally, as shown in 254 molecular strands/sequences of different populations include different identifications segments/sections identifying their respective population, and distinguishing between the molecules of different populations.

Figure 6:
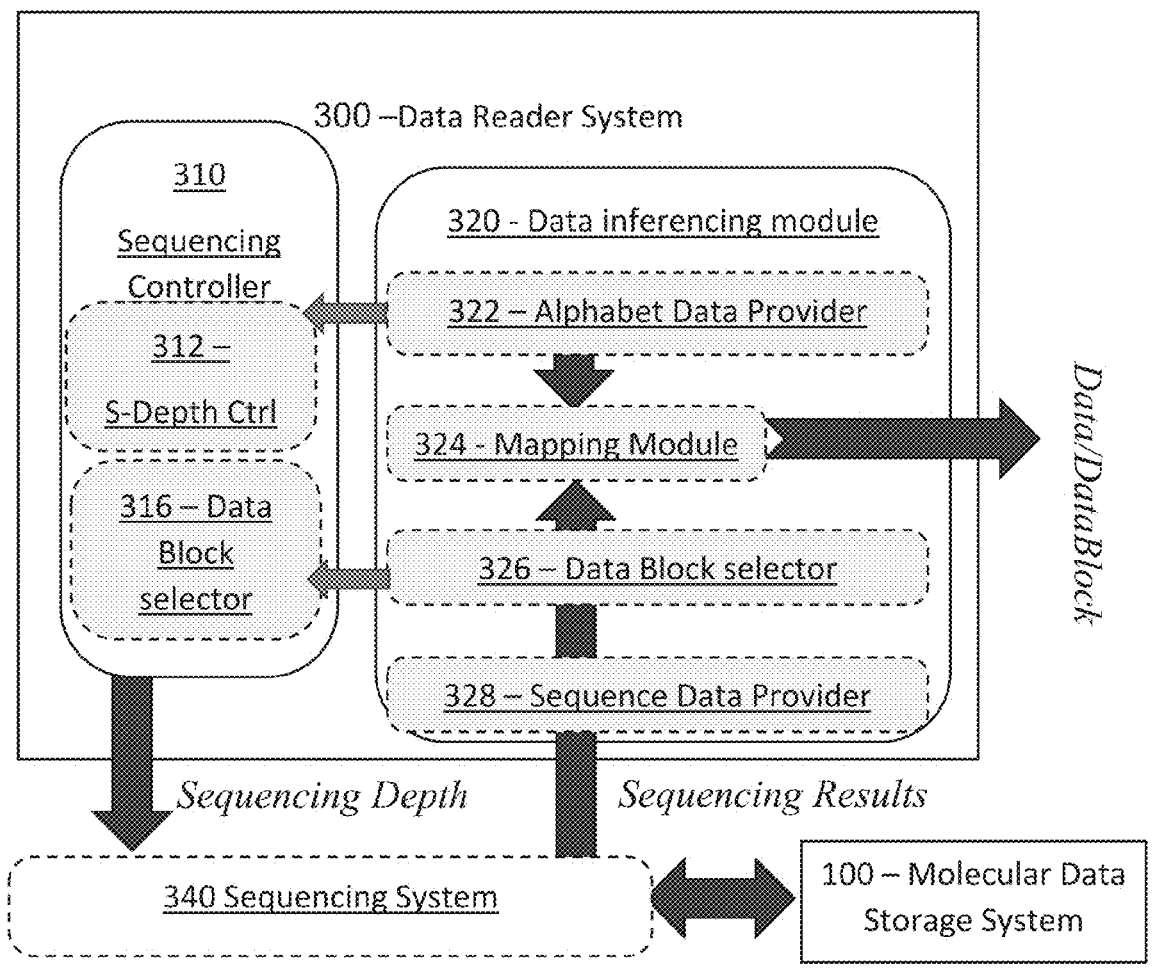
FIG. 6 is a block diagram of a data reader system 300 configured and operable for reading data stored in a molecular data storage according to an embodiment of the present invention.

Reference is now made to FIG. 6 which is a block diagram of a data reader system 300 configured and operable according to an embodiment of the present invention. The data reader system 300 is configured and operable for reading/inferring data encoded in molecular data storage systems of the present invention, such as 100, 100A, 100B disclosed above with reference to FIGS. 1, 3 and 4A to 4C.

The data reader system 300 includes a sequencing control module 310 (hereinafter also referred to as sequencing controller) configured and operable for connecting-to/communicating-with a sequencing system 340 (which may or may not be part of the system 300), and data inferencing module 320. The inferencing module 320 may include an alphabet data provider module 322 configured and operable for obtaining data indicative of an alphabet $\Sigma$ which is used for encoding data in a molecular storage system of the invention (e.g. the alphabet data may be such as that exemplified in FIG. 2).

To this end, based on the alphabet $\Sigma$, the data reader system 300 (e.g. the sequencing controller 310) may determine a required nominal sequencing depth N to sequence the population of molecules of the molecular data storage system 100. In this regard it should be noted that the one property of the alphabet which can be used to determine the required nominal sequencing depth N, is the resolution parameter R of the alphabet $\Sigma$. More specifically, the nominal sequencing depth N required for reliable reading/inference of the data stored in the molecular data storage is a function of the resolution parameter R of the alphabet $\Sigma$ (whereby higher resolution means smaller statistical distance/difference between the definitions of different letters in the alphabet, which thus requires higher sequencing depths, namely deeper reading, in order to obtain and reliably infer the letters encoded in the population of molecular strands/sequences). The required nominal sequencing depth N is also a function of the Inference Error probability, iErr, being the probability of wrongly associating a synthesized letter $\pi^k$ that is being sequenced from the population 112 of molecules, to the correct letters of the alphabet $\Sigma$. In this regard it should be understood that the synthesized letter $\pi^k$ is actually synthesized/written in location k of the plurality of molecular strands/sequences in the population 112 by the existence of building-blocks of the Z different types with amounts/concentrations (probabilities of existence) $\{C(E_n)\}^k_{n=1\ to\ Z}$ which corresponds to the probability vector $\{P^{k,n}\}$ of the alphabet letter $\sigma^k$ that should have been written in the location k. Indeed the population 112 may include in the order of O~$10^5$ to $10^8$ molecular strands/sequences by which the synthesized letter $\pi^k$ is written. However, when sequencing the population 112, only the order of N molecules is sequenced (N being the sequencing depths). This may lead to the inference Error iErr, which is the statistical error associated with a possible error selection/end examination of only N out of the O molecules in the population. This may lead to a discrepancy between the synthesized letter $\pi^k$ that is written in the population 112 in the form of the amount/concentration vector $\{C(E_n)\}^k_{n=1\ to\ Z}$ of the Z types of basic building block molecules in the location k of the population, and observed probability vector $\{X^k\}$ that the Z types of building blocks (monomers) appear in the location k, due to that the observed probability vector $\{X^k\}$ is determined based only on a number N molecular strands/sequences that are being sequenced out of the O molecules of the population 112 (N being the sequencing depth). Thus, a higher sequencing depth N provides for reducing the Inference Error probability, iErr, for a given resolution R of the data storage system 100. To this end the Inference Error probability is given as a function of the resolution R of the alphabet of the data storage system and the sequencing depths as follows: N=F(R, iErr).

Accordingly, in some embodiments the alphabet data provider 322 may be adapted to provide the sequencing controller with data indicative of the resolution property of the alphabet used in the data storage system 110 that is to be sequenced, and the sequencing controller 310 may include a sequencing depth controller 312 that is adapted to utilize input/reference data indicative of an acceptable inference error iErr by which the encoded data should be determined, and utilize the relation N=F(R, iErr) indicated above in order to determine a sequencing depth N by which to operate the sequencing system 340 for sequencing the data block 110.1 of the data storage system 100.

Figure 7:
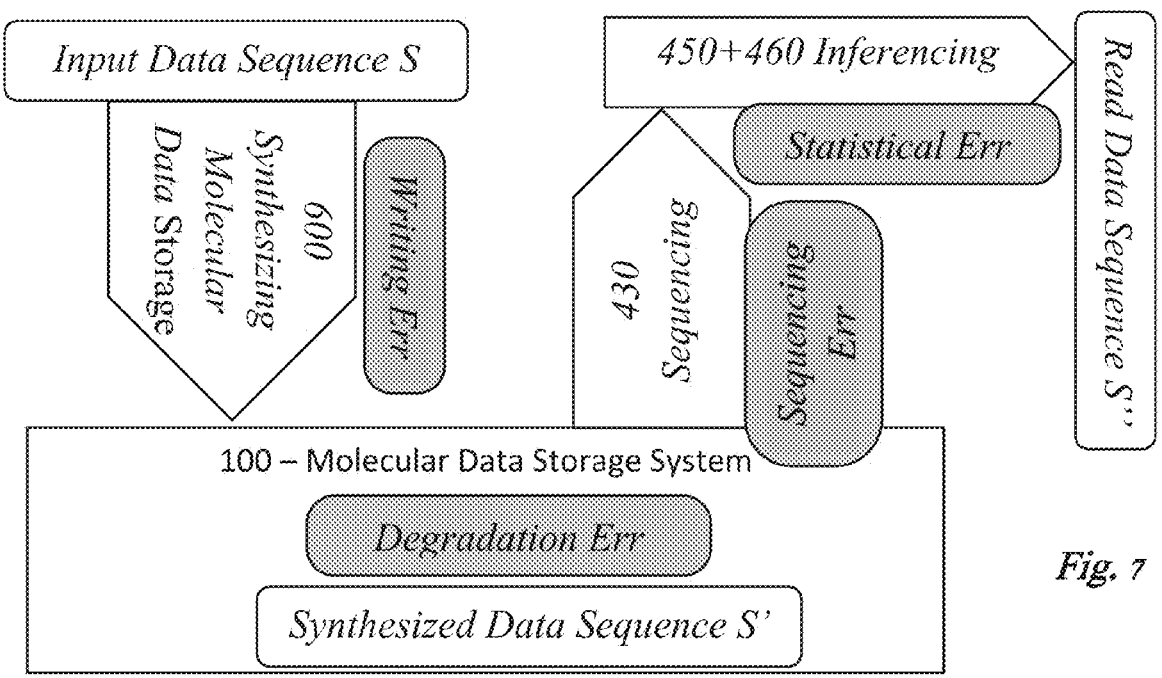
FIG. 7 is a flow chart showing various data errors which may be introduced during a lifetime of a data storage starting from a writing operation, in which a molecular data storage is synthesized/fabricated, throughout the storage state/time duration, during which data is stored by the molecular data storage; and finally during the reading operation, in which molecules of the molecular data storage are sequenced and the data is inferred.

In this regard, it should be noted that the inferencing error is not the only error that may introduce discrepancy between the input data sequence S, which is written in data storage system 100, and the data sequence S" being thereafter read from the data storage system 100. Turning now to FIG. 7, a general flow chart of the writing (synthesizing/fabricating) operation of the data storage system 100 (method 600 described in more detail below) and thereafter reading (sequencing) of the data storage system 100 or at least one data block 110.1 thereof (method/operations 430, 450 and 460 described in more detail below), is shown, with the errors which may be introduced to the data in each operation. These are:

(a) wErr—writing-err (also referred to herein as synthesizing error) is a probability that during synthesis of a letter $\sigma^k$ of the Input Data Sequence S, a different letter $\pi^k \neq \sigma^k$ would be actually synthesized in the population 112 of molecular strands/sequences. To this end wErr presents a probability of incorrect transcript of a letter $\sigma^k$ of the Input Data Sequence S to an encoded/synthesized letter $\pi^k$ in the corresponding location k of the synthesized sequence S'.

(b) dErr—degradation-err is a probability of degradation introduced, of errors in a synthesized letter $\pi^k$ of the sequence S' synthesized in the population 112 of molecular strands/sequences=$\{\pi^k\}$ due to degradation of the population of molecular strands/sequences 112 of the data-block 110.1. The degradation-err dErr is generally a function of time and of environmental conditions at which the data storage system 100 is kept.

(c) sErr—sequencing-err is a probability of introduction of errors during the sequencing of the population of molecular strands/sequences 112 of the data-block 110.1. Actually, during sequencing of nominal sequencing depth N, a subset of about N molecules (roughly N) of the population 112 (e.g. of the data block 110.1) are sequenced to determine an observed/sequenced data sequence S" which is indicative of a sequence of observed probability vectors S"={$X^k$}. Each probability vector $X^k$ at the location k of the observed/sequenced data sequence S" may be defined as $X^k$={$C_k"(E_n)/N"$}$_{n=1\ to\ Z}$, whereby the index n in the vector runs from 1 to Z and is indicative of the various types of basic molecular building-blocks; N" is the actual sequencing depth by which sequencing was performed; and $C_k"(E_n)$ is the amount/number of basic molecular building-blocks of type $E_n$ that were actually found at the $k^{th}$ location of the N" molecular strands/sequences which were sequenced (to this end $C_k"(E_n)$ is the observed value of the concentration/amount $C_k(E_n)$ defined above). Accordingly, $C_k"(E_n)/N"$ represents the observed probability that monomer/building-block of type $E_n$ is found in the $k^{th}$ location of the molecular strands/sequences of the population of molecular strands/sequences 112 of the data-block 110.1.

(d) iErr—inferencing error (also referred to herein as mapping error) is the statistical error associated with inferencing the correct inferred letter $\sigma"^k$ based on the observed probability vector $X^k$, due to limitations of the sampling size (sequencing depth).

Considering the above sources of error, a reliability factor RL of correct reading of the data storage, (namely RL being the probability that the correct letter $\sigma"^k$ would be decoded/inferred from the location k of the data storage on corresponds to the letter $\sigma^k$ of the sequence S that was intended to be written in the location k) is given by: RL=(1−wErr)*(1−dErr)*(1−sErr)*(1−iErr).

Accordingly, turning back to FIG. 6, in some embodiments the sequencing controller 310 in FIG. 6 may include a sequencing depth controller 312 that is adapted to utilize input/reference data indicative of a desired reliability factor RL for restoring the data, and utilize a relation N=F(R, RL) (where R is the resolution property of the alphabet) in order to determine a sequencing depth N by which to operate the sequencing system 340 for sequencing the data block 110.1 of the data storage system 100.

Alternatively, or additionally, the system may include a sequencing depth controller 312 of the sequencing controller 310 which may be adapted to operate the sequencing system 340 to sequence a population 112 of molecular strands/sequences PMs with a predetermined nominal sequencing depth N.

Thus, the sequencing controller 310 is adapted to operate the sequencing system 340 to sequence a population 112 of molecular strands/sequences PMs with nominal sequencing depth N.

In this regard it should be noted that in various embodiments of the present invention the sequencing controller 310 may be adapted to operate the sequencing system 340 to sequence the plurality of populations (data blocks) of the data storage system 100, and the resulted sequenced data of the plurality of data blocks may be provided (e.g. from the sequencing system 340) to the Sequence Data Provider module 328 of the data inferencing module 320. In turn, the data inferencing module 320 may include a data-block selector module 326, configured and operable for selecting the one or more data blocks (e.g. 110.1) of the data storage system 100 whose data are to be determined/inferred, and extracting, from the sequenced data (sequencing results) which are received by the Sequence Data Provider module 328, the relevant sequencing data of the data of the selected one or more data blocks (e.g. 110.1). To this end, in this case the sequencing controller 310 operates the sequencing system 340 to sequence all/a plurality of data blocks in the data storage system 100, and extraction of the sequenced data of the relevant data block is performed after the sequencing.

Alternatively or additionally, in some embodiments the sequencing controller 310 may be adapted to operate the sequencing system 340 to sequence the population(s) of only the selected one data block (or more than one data blocks) of the data storage system 100. The sequencing controller 310 may include a data-block selector module 316 that is configured and operable for selecting the data block (or the plurality thereof) which needs to be sequenced. This may be based on input data indicative of the required blocks. In turn, the sequencing system 340 operates to discriminate between (e.g. exclusively sequence) the molecular strands/sequences of the selected data block/population, whereby such discrimination may be based on the region/location at which the molecular strands/sequences of the selected data block/population are located in the data storage system 100 (i.e. considering that this location may be exclusive to the selected population) or by utilizing specifically selected binding molecules which are configured and operable to selectively bind to a unique identification segment associated with molecules belonging to the selected population. It should be understood that this technique can only be operated with populations whose molecules include respective identification segments, and only in case the case the sequencing system 340 includes (or can synthesize "on the fly") one or more collections of binding molecules, where binding molecules of each collection are adapted to exclusively bind to a respective population (to the identification segment thereof). Thus, in that case, upon receiving operational instructions of the selected data block from the data-block selector module 316, the sequencing system 340 utilizes the designated region of the selected data-block/population, and/or utilizes/synthesized binding molecules capable of binding to the identification segment of the selected data-block/population, to extract/sequence the molecules of the selected data-block separately and provide the sequenced data/results to the Sequence Data Provider module 328.

In turn, regardless of whether data-block selector module 316 and/or data-block selector module 326 is used, the sequencing data/results corresponding to the data segments of the population of molecules in the selected data blocks are provided (separately per each respective data block) to the mapping module 324 of the data inferencing module 320.

To this end, the population 112 of molecular strands/sequences PMs of the selected data-block, e.g. 110.1, is sequenced with an N" fold sequencing depth (or higher); it is noted that not necessarily the actual sequencing depth N" is/can be controlled a priori, and may somewhat deviate from the intended/requested sequencing depth N by which the sequencing system 340 was operated. The sequencing of the selected data-block, e.g. 110.1 yields a series/sequence of observed probability vectors {$X^k$}, including an observed probability vector $X^k$ per each location k in the data segments of the molecular strands/sequences PMs of the population of the selected data-block. 110.1. As indicated above, the observed probability vector $X^k$ of each location k is generally indicative of the normalized number/amount of building-blocks/monomers of each type $E^n$ found in the location k of the N" molecular strands/sequences, which were sequenced from the population 112: $X^k$={$C"^k(E^n)/N"$} where the index n of the monomer types runs from n=1 to Z (namely to cover all possible types of participating building-blocks).

The mapping module 324 is configured and operable to map/associate each observed probability vector $X^k$ of location k in the sequencing results of the data-block, with the corresponding alphabet letters $\sigma'^k$ being read/inferred from that location. This should be determined per each location k out of 1 to K locations of a storage segments of the molecular strands/sequences of the population 112.

Indeed the alphabet letters $\{\sigma'^k\}$ being read from the respective locations k should generally belong to the alphabet $\Sigma$: $\sigma'^k \in \Sigma \equiv \{\sigma_m\}|_{m=1\ to\ M}$. As indicated above, each letter $\sigma_m$ of the alphabet is defined by respective probability vector $\sigma_m \equiv \{P_m^n\}_{n=1\ to\ Z}$. Accordingly, the mapping module 324 may be adapted to determine the alphabet letter $\sigma'^k \in \Sigma$ whose divergence from the observed probability vector $X^k$ is minimized: $\sigma^k = \text{ArgMin}[\{\sigma_m\}_{m=1\ to\ M}|D\ (\sigma_m, X^k)]$, where D is a divergence function. This provides for mapping each observed probability vector $X^k$ to its respective inferred alphabet letter $\sigma'^k$.

In some embodiments the divergence function D which is used by the mapping module 324 for mapping the observed probability vector $X^k$ to the alphabet letter $\sigma'^k \in \Sigma$ is an $L^p$ distance function defined over a so-called $L^p$ space. In this regard, as generally known, $L^p$ spaces (also sometimes called Lebesgue spaces) are function spaces defined using a natural generalization of the p-norm for finite-dimensional vector spaces. In some examples, the $L^p$ space is a Euclidean space and thus the divergence function D which is used for the mapping is the Euclidian distance/norm $D\ (\sigma_m, X^k) = \|\sigma_m - X^k\|$. The dimensionality of the space may be the number Z of building-block types, which is actually the size Z of the probability vectors of defining the alphabet $\Sigma$ letters $\sigma_m$ and the observed probability vectors $X^k$.

Alternatively or additionally, in some embodiments the mapping module 324 is configured and operable for utilizing the Kullack-Leibler (KL) divergence as the divergence function $D\ (\sigma_m, X^k)$ by which the mapping is performed. To this end $D\ (\sigma_m, X^k) = KL\ (\sigma_m, X^k)$. The Kullback-Leibler divergence, also known as relative entropy, is a measure of the divergence of one probability distribution from a second, expected probability distribution. In the simple case, a Kullback-Leibler divergence of 0 indicates that similar, if not the same, behavior of two different distributions can be expected, while a Kullback-Leibler divergence of 1 indicates that the two distributions behave in such a different manner that the expectation of seeing the second distribution in an observation, given the first distribution as the generating mechanism, is small.

In this regard, the inventors of the present invention have noted that using the Kullback-Leibler divergence for mapping an observed probability vector $X^k$ to the inferred alphabet letter $\sigma'^k \in \Sigma$ may be advantageous, and in some cases yields superior results (better/higher reliability factor RL) and particularly may result in reduced mapping/inference errors. This is because minimizing the KL divergence represents the maximum likelihood probability distribution that generates the observed frequencies $X^k$.

For instance:

$$KL(P, Q) = \sum_m P_m \log\left(\frac{P_m}{Q_m}\right)$$

where m runs over the types of basic molecular building blocks used. To this end, when using the error-aware multinomial model, the KL approach is equivalent to a Maximum-Likelihood mapping. Since the KL measure is highly sensitive to letters on the edges of the simplex, this approach may be implemented using a variation of the composite alphabet in which zero entries in the probability vectors are replaced with some non-zero small value $\epsilon > 0$.

Nonetheless, in some other embodiments, the LP distance function(s), e.g. Euclidean distance, may be used.

Thus, utilizing the selected/a priori-set divergence function, the mapping module 324 maps/associates each of the observed probability vectors $\{X^k\}$ to respective inferred letters, thus determining an inferred/read sequence $S'' = \{\sigma'^k\}$ which, subjected to the reliability factor RL, is similar to the original sequence $S = \{\sigma^k\}$ that was encoded/synthesized in the respective data-block, e.g. 110.1, of the data storage module 100.

Reference is now made together to FIGS. 8A and 8B which show together a flow chart of a method 400 for reading data stored in a molecular data storage system 100 according to an embodiment of the present invention.

In 410, a molecular data storage system 100 including at least one data-block encoding data, e.g. 110.1, is provided. The at least one data-block 110.1 is formed by at least one respective population 112 of molecular strands/sequences PMs, which are formed with strings representing chains of building-blocks including a number Z of different types of building-blocks. The data of the data-block 110.1 is encoded in sequence $S' = (\pi^1, \pi^2, \ldots, \pi^k \ldots, \pi^{K-1}, \pi^K)$ (e.g. ordered) of encoded letters $\{\pi^k\}$ belonging to the alphabet $\Sigma$, whereby the identity of each encoded letter $\pi^k \in \Sigma$ is indicated by the types of building-blocks existing at certain respective locations corresponding to k along the building-block strings of the molecular strands/sequences of the population 112.

Optionally, in 420 (which may be carried out prior to sequencing of molecules of the population 112), the molecules of the certain population 112 may be distinguished (e.g. separated and/or identified), from molecules of other populations, if such exists. In case there is only one population/data-block, this operation is trivial, as shown in optional 422. Alternatively or additionally, in case the data storage system 100 is configured such that the molecules of the certain population 112 reside separately from other populations, location based sequencing 424 of the molecules may be performed only at the region of the population 112 thereby not sequencing (distinguishing from) molecules of other populations. Yet, alternatively or additionally, in case the molecules of the certain population 112 include population identification segments ID-SEG uniquely identifying the certain population 112, specific binding to these population identification segments 426 may be carried out in order to distinguish (exclusively extract) molecular strands/sequences of the certain population 112, for further sequencing. In this regard, it should be noted, and also as indicated above, that optionally the difference of the population identification segments that are indicative-of/associated-with different populations, is made sufficiently large, such that the binding is substantially exclusive to population identification segments of the certain population 112, and the same binding molecule designed for identification segments ID-SEG of the certain population 112 does not happen to bind "by existence" to a somewhat different identification segment ID-SEG of other populations (since the "distance"/difference between such identification segments is sufficiently large).

In 430, sequencing of N fold nominal sequencing depth is performed to the molecular strands/sequences of the data storage system 100, or just to the molecular strands/sequences of the specific/certain population 112 (depending on implementation and/or possibly on whether 420 was performed, or 440 is to be performed). To this end, optional 440 is performed in cases where there is more than one population 112 (more than one data block 110) in the data storage system 100 and 420 was not/could not be performed in order to distinguish the population 112 of the respective data block of interest, e.g. 110.1, from other populations 112 (from other data-blocks). In this case 440 may be carried out to identify from the sequencing results, the sequenced molecules whose respective identification segments (if such exist) match the identification segment ID-SEG of molecules of the certain population of interest 112.

Thus, finally after 430 is performed, and optionally also 420 and/or 440, sequencing results with sequencing depth N" being about the nominal sequencing depth N are obtained for the molecules of the certain population of interest 112. The sequencing results include data indicative of the data storage segments DATA-SEG of the sequenced molecules of the population 112.

Accordingly, in 450, the data storage segments of the sequenced molecular strands/sequences PMs of the certain population 112 are processed to determine per each location k (of the K locations in the data storage segments DATA-SEG of the sequenced molecular strands/sequences), an observed probability vector $X^k$ indicative of observed relative amounts of the Z types of building-blocks $\{E^n\}$ in the location k. This may be achieved by counting' per locations k, how many times each type of the Z building-block types appear in that location in the number N" of sequenced molecules of the population 112 (e.g. and then normalizing by division by N" to get a probability value).

In this regard it should be noted that observed probability vectors are not obtained for ID segments, since the ID segments do not encode letters of the alphabet Σ (which includes composite letters), but, on the contrary, in each location in the ID segments of all the molecular strands/sequences of the population, the same building-block type should exist as defined by the id of the population (a molecule with different monomer types is not associated with the same population).

In 460 the inferred letters in the read sequence S" are inferred by associating each inferred observed probability vector $X^k$ with an inferred letter $\sigma''^k$ of an alphabet $\Sigma \equiv \{\sigma_m\}|_{m=1 \text{ to } M}$. The inferred sequences S" of alphabet letters read from the molecular data storage are thus determined as follows $S''=(\sigma''^1, \sigma''^2, \ldots, \sigma''^k \ldots, \sigma''^{K-1}, \sigma''^K)$. The inferred sequences S" should generally correspond to the encoded sequence $S'=(\pi^1, \pi^2, \ldots, \pi^k \ldots, \pi^{K-1}, \pi^K)$ in the certain population 112, up to errors which may be associated with the sequencing errors sErr and inference/mapping errors iErr indicated above.

As indicated in the figure, optionally 461 is conducted for mapping each observed probability vector $X^k$ to the respective inferred alphabet letter $\sigma''^k \in \Sigma$, by determining the alphabet letter $\sigma''^k \in \Sigma$ that satisfies a minimum divergence D from the observed probability vector $X^k$: $\sigma''^k = \text{ArgMin}[\{\sigma_m\}_{m=1 \text{ to } M} | D(\sigma_m, X^k)]$. As indicated above, optionally the divergence function used, $D(\sigma_m, X^k)$, is an LP distance function, such as Euclidian distance. Alternatively, $D(\sigma_m, X^k)$ is KL divergence.

As indicated in optional 463, according to some embodiments of the present invention the alphabet Σ that is used for reading/inferring the encoded data may have a size M≡|Σ| that is greater than the number Z of the different building-block types (M>Z). This presents a significant advantage as it provides a higher numerical basis M of the data encoding (as compared to a numerical basis Z in case no composite letters are used), and thus higher data density may be encoded and read from the same population of molecules.

As indicated in optional 464, according to some embodiments of the present invention each letter $\sigma_m$ of the alphabet Σ is defined by a probability vector $\sigma_m \equiv \{P_m^n\}|_{n=1 \text{ to } Z}$ indicative of relative amounts of the Z building-block types $\{E^n\}|_{n=1 \text{ to } Z}$. This actually provides/exemplifies a mechanism for defining an alphabet Σ of size M≡|Σ| that is greater than the number Z of the different types (M>Z). Accordingly this presents a significant advantage in terms of the high data density that may be encoded and read from the population of molecules 112.

To this end, as indicated in optional 466 the alphabet Σ may include at least one composite letter $\sigma_{m1}$, whose probability vector $\{P_{m1}^n\}$ includes two or more non-zero probabilities. Also, as indicated in optional 467, the alphabet Σ may include one or more simple letters $\sigma_{m2}$ whose probability vector $\{P_{m2}^n\}$ includes only non-zero probability (i.e. indicating a non-zero probability for only a single building-block type). Accordingly, typically, the number of simple letters is equal to the number Z of different building-block types.

Figure 9:
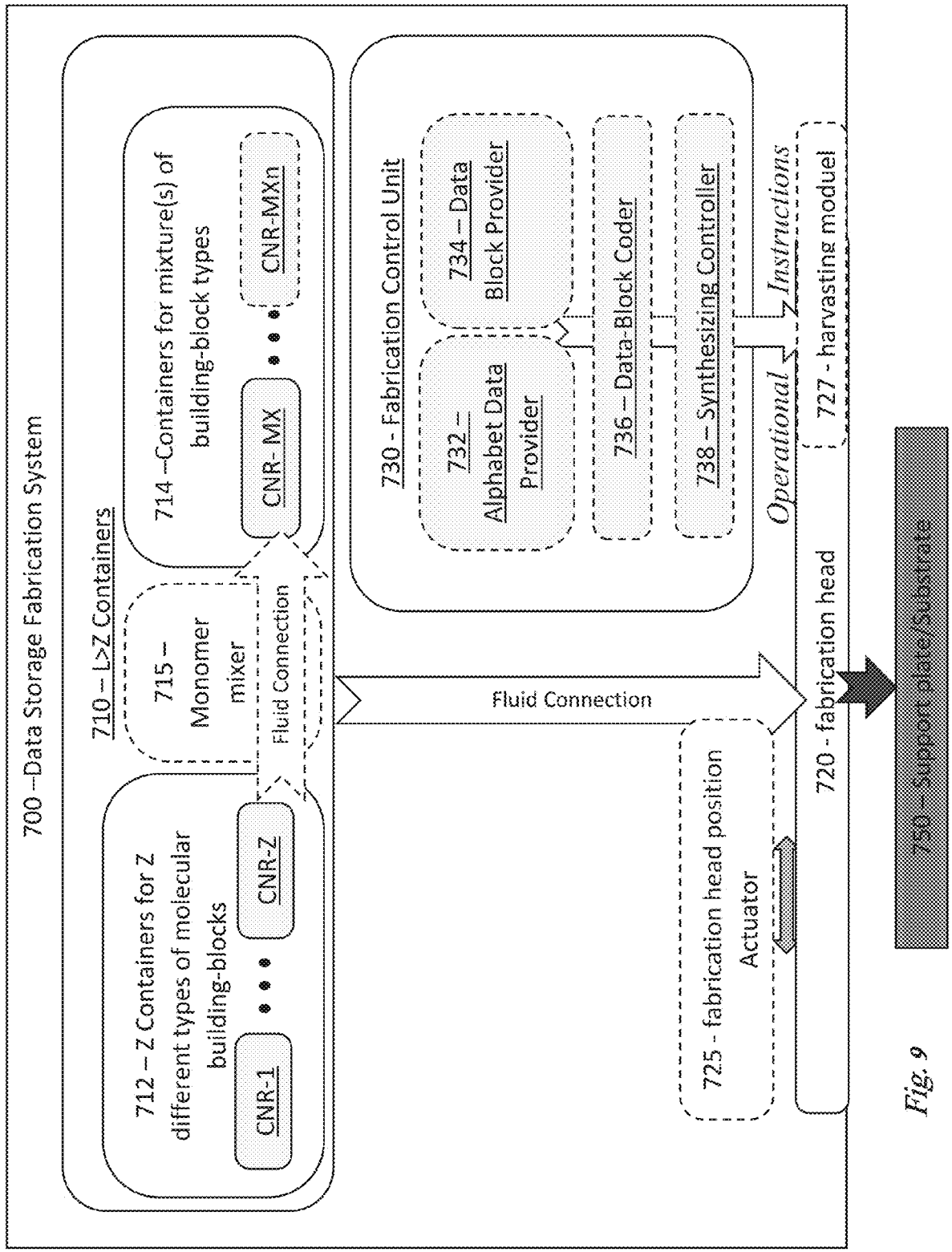
FIG. 9 is a block diagram of molecular data storage fabrication system 700 according to an embodiment of the present invention.

Reference is now made to FIG. 9 illustrating a block diagram of molecular data storage fabrication system 700 according to an embodiment of the present invention. The molecular data storage fabrication system 700 is configured and operable to fabricate a molecular data storage structure/system 100 such as those described above with references to FIGS. 1, 3 and 4A to 4C.

According to some embodiments, the molecular data storage fabrication system 700 includes module 710 including at least L building-block containers, whereby the number L of containers is greater than the number Z building-block types (e.g. monomers/oligos), which are used for fabricating the molecular strands/sequences PMs of the molecular data storage system 100. The molecular data storage fabrication system 700 also includes a molecular strand/sequence fabrication head 720 that is fluidly connected to the L building blocks containers 710. The fabrication head 720 is configured and operable for selectable and controllable deposition of a volume of building-blocks, which are contained in a selected one of the L building-block containers. In this sense, the fabrication head 720 may be configured and operable as a monomer/building-block printing jet head capable of injecting building-blocks from a selected container according to instructions provided to the fabrication head 720 from the fabrication control system/unit 730, which is also a part of the system 700.

According to some embodiments of the present invention, Z containers, 712, out of the L building-block containers, which are marked in the figure by CNR-1 to CNR-Z are adapted for separately containing different ones of the Z different types of building-blocks $\{E_n\}|_{n=1 \text{ to } Z}$. The remaining L-Z container(s), 714, which are marked in the figure CNR-MX and optionally also an additional one or more containers up to CNR-MXn, are monomer mixture containers, adapted for containing one or more different mixtures, each composed of a mixture of two or more of the Z types of basic molecular building-blocks.

According to some embodiments of the present invention the fabrication control unit 730 is configured and operable to operate the fabrication head for fabricating the molecular data storage system 100. To this end, the fabrication control unit 730 may include a Data Block Provider 734 configured and operable for receiving/providing at least one block of data (sequence S) that is to be encoded in the molecular data storage system 100. According to some embodiments of the invention, the data of the data block is encoded by "printing"/synthesizing a population of molecular strands/sequences at a region designated for the data block, on a support substrate/plate 750.

The fabrication control unit 730 may also include an alphabet Data Provider 732 which is adapted to provide (e.g. receive and/or retrieve from a reference data storage (e.g. local or remote memory) data indicative of an alphabet Σ, which is to be used for encoding the block of data on the designated location of the support substrate 750. As indicated above, according to some embodiments of the present invention, the alphabet Σ is of size greater than the number Z of different building-block types: |Σ|≡M that >Z. To this end, each of the letters $\{\sigma_m\}_{m=1 \text{ to } M}$ in the alphabet Σ may be defined by respective probability vector $\sigma_m = \{P_m^n\}|_{n=1 \text{ to } Z}$ that is indicative of expected probabilities $\{P_m^n\}$ that basic building blocks (monomers/oligos) of respective types $\{E_n\}$ are synthesized at a designated location (k) along the molecular strings/strands/sequences of the population, at which the letter $\sigma_m$ is encoded.

Accordingly, the numerical basis for encoding the block of data (sequence S) provided by 734 is the size M of the alphabet Σ provided by 732. To this end, the fabrication control unit 730 may also include a Data-Block Coder 736 adapted to process the received block of data (sequence S) to present it as a sequence of letters of the alphabet Σ with the numerical basis M>Z. To this end the block of data is coded by a sequence S of letters $\{\sigma^k\}|_{k=1 \text{ to } K}$ belonging to the alphabet.

The fabrication control unit 730 includes a Synthesizing Controller 738 adapted for synthesizing a population 112 of molecular strands/sequences encoding the data block at the designated region on the support substrate 750. Synthesizing Controller 738 is configured for preparing operational instructions of operating the fabrication head 720, to sequentially deposit volumes/amounts of building-block types/mixtures from the containers 710, whereby the sequence of deposited building-block types/mixtures corresponds to the sequence of letters $\{\pi^k\}|_{k=1 \text{ to } K}$ in blocks of data. Simple letters are synthesized by depositing a volume of a respective monomer type obtained from the Z containers; and composite letters are synthesized by depositing a volume of a mixture of building-block types with concentrations matching the probability vector of the composite letter, obtained from one of said one or more mixture containers.

Thus, as indicated above, the alphabet Σ may include up to Z simple letters whose probability vectors $\{P_n\}_m$ include only one probability having non-zero expected value, and one or more composite letters whose probability vectors include two or more probabilities having non-zero expected value. The Z containers, 712, which are marked in the figure by CNR-1 to CNR-Z, are adapted for each storing/containing basic molecular building-blocks of a single type. Accordingly, for fabricating a simple letter $\sigma_m$, the fabrication head 720 draws the respective type of building-blocks (the only one having non-zero probability in the probability vector $\{P_n\}_m$ $P_{mn}$ of the simple letter) from the corresponding one of the Z containers 712 in which the respective building-block type is contained. For fabricating a composite letter $\sigma_m$, the fabrication head 720 draws a respective mixture of the types of building-blocks whose probabilities are non-zero p in the probability vector $P_{mn}$ of the composite letter for one of the L-Z containers, 714, whereby the concentrations/amounts $\{C_n\}$ of the different types $\{E_n\}$ of building-blocks in the mixture corresponds to the probability vector $\{P_n\}_m$ of the letter. As indicated above/below, such mixtures (e.g. mixtures corresponding to each composite letter) may be a priori prepared and contained in one of the building-block mixture containers (e.g. L-Z mixture containers CNR-MX to CNR-MXn may be included, one for carrying building-block mixture per each composite letter in the alphabet Σ). To this end, in such embodiments, the Synthesizing Controller 738 may be adapted for operating the fabrication head 720 for drawing the building-block types/mixtures of the respective simple/composite letters from the respective containers according to the respective letters that need to be synthesized.

Alternatively or additionally, the corresponding mixture for the composite letter am may be prepared "on the fly", e.g. on demand at the time each composite letter should be printed/synthesized. In this case as few as only a single mixture container CNR-MX may be included in 714, and the system may include a building-block mixer 715 (i.e. also referred to hereinafter as mixer), that is fluidly connected to the Z containers 712 of the respective building-block types, and adapted for drawing/mixing controlled amounts of the Z building-block types from the Z containers 712 for preparing in the mixture container CNR-MX, a controlled mixture of the different types $\{E_n\}$ of building-blocks with respective concentrations/amounts $\{C_n\}$ corresponding to the probability vector $\{P_n\}_m$ of the composite letter $\sigma_m$ that should be encoded. To this end, in such embodiments, the Synthesizing Controller 738 may be adapted for operating the mixer 715 for preparing, on demand, different mixtures of basic molecular building-blocks, which are associated with different respective composite letters that need to be synthesized. Also, the controller 738 may be adapted for operating the fabrication head 720 for synthesizing a simple letter by drawing the corresponding building-block type from the respective one of the Z containers 712 and depositing it on the respective location in the substrate 750, and synthesizing a composite letter by drawing the corresponding mixture prepared in the mixture container CNR-MX, or from other one of the mixture containers 714 if such are included in the system, and depositing it on the respective location in the substrate 750.

As may be appreciated by those versed in the art, the fabrication head 720 may be configured similar to conventional molecular strands/sequences fabrication heads used for controlled synthesis of molecular strands/sequences. For instance see [5]. Also, according to some embodiments of the present invention, the types of basic building blocks (monomers/oligos) contained in the containers 710 are "blocked" (i.e. capped/protected; e.g. such as described in [5]) from one end thereof, in order to prevent their binding to one another. Accordingly, in some embodiments of the present invention the system 700 (e.g. the fabrication head 720) is configured and operable for carrying out the following after each deposition, at the designated region, of a volume of basic building blocks corresponding to each of the letters of the sequence S:

(a) Washing the region to remove un-bonded basic building blocks deposited at the region (this is may be performed as conventionally done with molecular-strand/polymer synthesis [5]); and (b) Applying un-blocking treatment to "un-block" (i.e. de-capping/de-protecting) basic building blocks from being bounded to molecules at the designated region (this may be performed as conventionally done with molecular-strand/polymer synthesis by [5]).

Additionally, in some embodiments, the fabrication head 720 is configured and operable for depositing cleavable molecules at the designated region at which the population of the molecules should be synthesized. This is typically performed prior to the synthesizing. The system may also include a harvesting module 727 configured and operable for harvesting the population of molecules 112 from the designated region (e.g. by cleaving the cleavable molecules). The control unit may be adapted to operate the fabrication head 720 for depositing the cleavable molecules on the designated region of the substrate 750, prior to synthesis of the population of molecular strands/sequences. Then, synthesis of the population of molecular strands/sequences on the designated region such that they are bonded to the cleavable molecules is performed; then, after synthesis is completed, operating the harvesting module 727 for harvesting the population of molecules 112. Cleavage of molecules from surfaces that support the synthesis is described in the literature (Ref [5]—Leproust et al NAR 2010).

As indicated above, in some embodiments the molecular strands/sequences of the population should include similar identification segments (e.g. typically but not necessarily similar to all molecules of the population) whereby the identification segment includes an identifying sequence of the Z building-blocks/monomer types. Accordingly, the control unit 730 may be adapted for operating the fabrication head 720 for synthesizing the identification segment for all molecules of the population. This is achieved by drawing the building-block types from the Z building-block containers 712, while not utilizing the mixture containers 714 or the building-blocks mixture (since only simple letters should be included in the identification segment).

In some embodiments the molecular data storage fabrication system 700 is configured and operable for fabricating different populations corresponding to different data-blocks 110 at different respective regions of the substrate 750. To this end the system may include a fabrication head position actuator 725 connectable to the fabrication head 720. The control unit 730 may be adapted for operating the fabrication head position actuator 725 for actuating/moving the fabrication head 720 to various designated regions on the substrate 750 and operating the fabrication head 720 to fabricate at each region a population of molecules corresponding to one of the plurality of data blocks. This provides for synthesizing a plurality of populations of molecular strands/sequences encoding data of a plurality of respective data blocks, at different spatially separated respective regions of the substrate 750.

It should be noted that in some embodiments, e.g. where harvesting is not performed, the molecular storage system 100 may actually be support plate/substrate 750 with the one or more populations of molecules thereon that were synthesized at the different regions thereof. Each population is associated with a respective data-block. Alternatively or additionally, in some embodiments e.g. where harvesting is performed, the harvested populations may be placed in separate containers/containing-regions, or in a common container in case the molecules of each population can be exclusively identified by an ID segment included therein. In this case the molecular storage system 100 is actually implemented by the separate containers and/or the common container with the populations of molecules therein.

In various embodiments the molecular data storage fabrication system 700 may be configured and operable for implementing the method 600 illustrated in FIG. 10.

FIG. 10 is a flow chart of a method for fabricating a molecular data storage system 100 according to an embodiment of the present invention. In various embodiments of the present invention the molecular data storage fabrication system 700 is configured and operable for implementing the method 600.

According to various embodiments of the present invention, the method 600 includes the following: In 610, a support substrate/plate 750 is provided with one or more spatially separated regions at which one or more respective populations of molecular strands/sequences can be synthesized. The synthesizing may be formed with Z different types of basic building blocks (monomers/oligos).

In 620 one or more blocks of data which are to be respectively encoded by one or more respective populations of molecular strands/sequences, are provided. As indicated above, the one or more respective populations of molecular strands/sequences are to be respectively synthesized at the one or more spatially separated regions of the support substrate/plate 750. Generally, the one or more blocks of data are coded by a sequence of letters $\{\sigma^k\}|_{k=1 \text{ to } K}$ of an alphabet $\Sigma \equiv \{\sigma_m\}|_{m=1 \text{ to } M}$ of size $|\Sigma|=M$, each letter $\sigma_m$ of the $\Sigma$ being defined by a probability vector $\{P_m^n\}|_{n=1 \text{ to } Z}$. In this regard, it should be understood, that considering a certain predetermined inference error rate, the blocks of data may include error correction code (such as Reed-Solomon codes), usable as correcting errors in the read data. For example the inference rate may be 90% or even above (98% or 99%), and the error correction code in the data blocks themselves may be used after the data was inferred in order to correct residual data errors, which were not corrected/overcome by the distance function.

In 630, a population of molecular strands/sequences is synthesized per each block of data, at a respective region of the one or more regions of the support plate. The molecular strands/sequences of the population are synthesized with building-block strings formed with a number Z<M of different types of building-blocks $\{E\}$n- to z, (whereby M is the number of letters in the alphabet, and is actually the numerical basis by which the block of data is encoded). To this end the synthesizing of the population of molecular strands/sequences at the respective region includes synthesizing the sequences of letters $\{\sigma^k\}|_{k=1 \text{ to } K}$ corresponding to the data of the data-block. Synthesizing each letter may be carried out by depositing a composition of building-blocks $\{E_n\}|_{n=1 \text{ to } Z}$ of the Z different types with relative concentrations $\{C(E_n)\}|_{n=1 \text{ to } Z}$ corresponding to the probability vector $\{P^{k,n}\}|_{n=1 \text{ to } Z}$ of the respective letter $\sigma^k$.

To this end, the depositing may optionally include:

632—Providing a volume of a composition of building-blocks with said relative concentrations. Optionally, the building-blocks provided in the composition, are "blocked" from one end to prevent their binding to one another. Optionally, the volume of the composition of building-blocks is acquired from a pre-prepared mixture having the desired relative concentrations corresponding to the letter $\sigma^k$ which is to be synthesized. Alternatively, the volume with the desired concentrations is prepared in-situ (e.g. in real time per each synthesized letter $\sigma^k$).

634—Depositing/placing the composition of building-blocks at the respective region to thereby enable binding at least some of the building-blocks in the composition to molecules at that respective region. Optionally, after the depositing, the respective region is washed to remove un-bonded building-blocks of the deposited composition. Then, optionally, an un-blocking treatment may be applied to the deposited building-blocks that are bounded to the molecules at the respective region, in order to "un-block" those building-blocks so that they can bind to other building-blocks that are to be deposited when synthesizing the successive letter.

According to some embodiments, the method further includes 640 for synthesizing, in the molecular strands/sequences of the population, a population identification segment indicative of the population and including an identifying sequence of the Z types of building-blocks. To this end, in some examples a difference between identifying sequences that are used in population identification segments of different respective populations may exceed a certain threshold of edit distance (e.g. edit distance of 2, 3 or higher—lower edit distance may be used for more accurate synthesis).

Also, optionally, according to some embodiments, the molecular strands/sequences are bonded to cleavable molecules that were a-priori residing at the certain region. Accordingly, in optional 650 the population of molecules may be harvested by cleaving the cleavable molecules. To this end, in some cases the support plate 750 includes cleavable molecules adapted to bind with said building-blocks, such that building-blocks of the composition, which are first deposited on said region, are bounded to the cleavable molecules.

Figure 11:
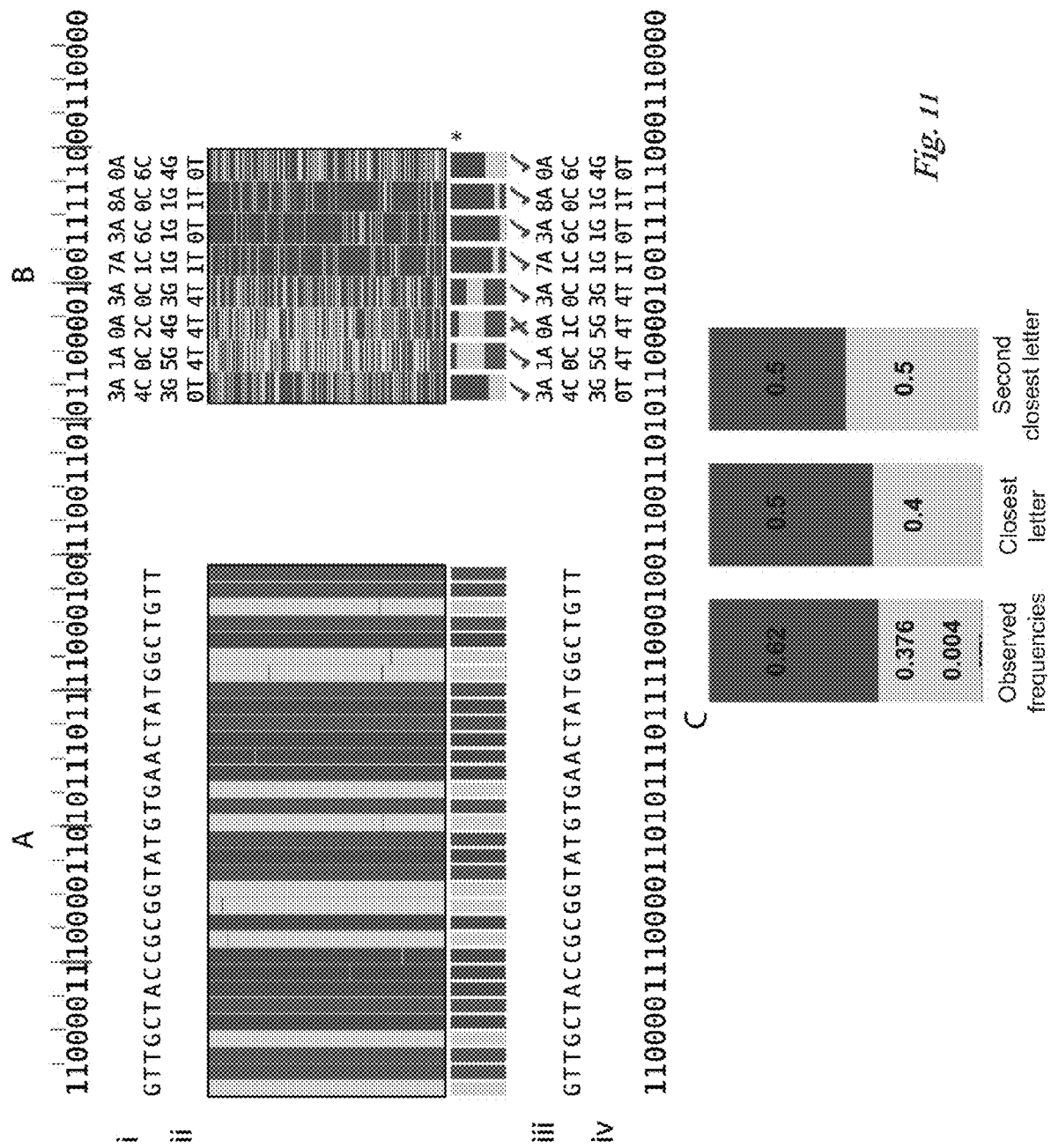
FIG. 11 is a schematic illustration of the encoding of a binary message using a conventional alphabet (with simple letters only), and a composite alphabet according to an embodiment of the present invention (having both simple and composite letters)

FIG. 11 is a schematic illustration of the encoding of a binary message using a conventional alphabet (with simple letters only), and a composite alphabet according to the technique of the present invention (namely including both simple and composite letters). In this example both alphabets are based on building-blocks being DNA monomers/nucleotides/oligos. A binary message, depicted in the top part of the figure, is encoded into DNA.

Section A in the figure shows a conventional DNA based storage scheme. The binary message is encoded to DNA by mapping every 2 bits (depicted by the red separating lines) to a DNA base or synthesized position (i), the designed DNA sequence is then synthesized and sequenced (e.g. typically by a noisy procedure that introduces some errors) (ii). The sequencing output is then used to infer the DNA composition at every position (iii). Decoding of the original message is done assuming the use of an error correcting code over the binary message (iv).

Section B in the figure shows the same message encoded using a composite DNA alphabet of resolution R=10. Accordingly, mapping is carried out every 8 bits (depicted by the blue separating lines) of the binary message, to a single composite DNA position/letter. Using sufficiently deep sequencing (e.g. of N=50 or N=100, or even lower N=10), allows to correctly identify the original composite letters, (the position marked by an asterisk is exemplified in section C in the figure), and to decode the message, also including an error correction mechanism.

Section C in the figure exemplifies an inference step of a given DNA position. The observed frequencies/concentrations of the nucleotides are used to infer the source/original letter, $\sigma=(0,0.6,0.4,0)$, as the closest composite letter, based on the KL divergence.

The feasibility of the composite DNA letters was demonstrated by fabricating, by the inventors, a complete molecular/polymeric data storage system (DNA based in this implementation) encoding message of 38 bytes using four composite alphabets of different resolutions. The message was encoded with information/data densities of about 4.3 bits per synthesized position. The composite DNA sequences were concatenated to flanking standard DNA sequences (not composite) containing a barcode (constituting a data segment), a unique molecular identifier (UMI) region (constituting an identification segment) and PCR templates used for constructing Illumina sequencing adapters. The designed DNA oligos (of length=99 bases) were synthesized using commercial technology (IDT, Leuven). The synthesized DNA was amplified using PCR, pooled together and sequenced using Illumina Mi-Seq. The reads were then analyzed to decode the original message.

Then the minimal sequencing depth required to correctly decode the message for each one of the four composite alphabets, was examined. As expected, extending the alphabet by using higher resolutions requires deeper sequencing. In all four alphabets that were tested, a fully successful decoding was observed with sequencing depths as small as N=100 (while a near-perfect decoding was obtained with even smaller sequencing depths, little N=50).

Figure 12:
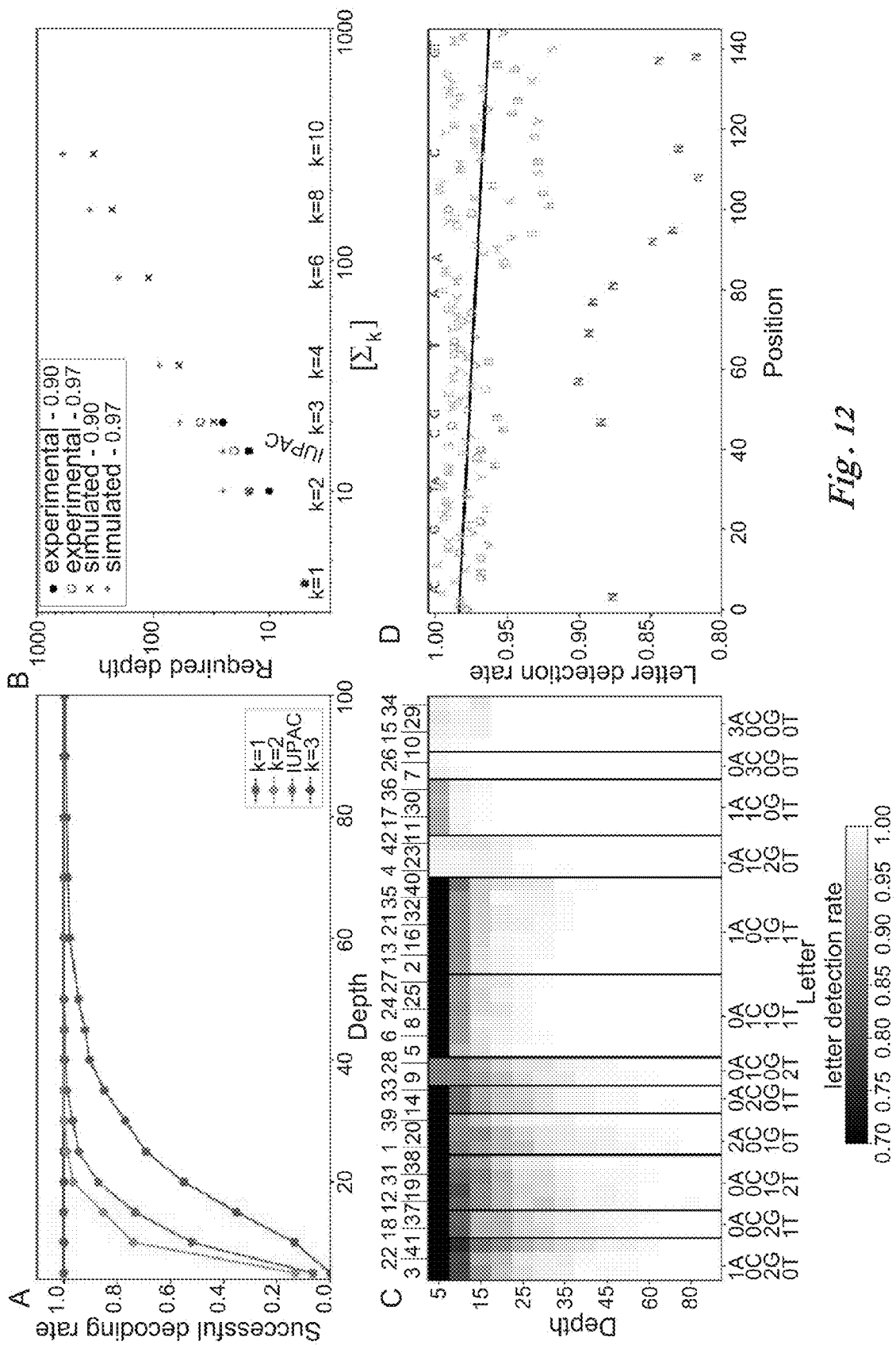
FIG. 12 is a self-explanatory graphical illustration of a DNA based information encoding in molecular data storage systems fabricated and based on four different respective composite DNA based alphabets with different resolutions.

FIG. 12 is a self-explanatory graphical illustration of the DNA based information encoding in the four molecular/polymeric data storage systems fabricated by the inventors with four different respective composite DNA alphabets having respectively the resolution parameters R=1, R=2, R=3, and R=4. Section A in the figure illustrates the successful decoding rate for the four composite DNA alphabets as a function of sequencing depth N which was achieved when the KL divergence function is used to infer the encoded composite letters. Section B in the figure illustrates the minimal sequencing depth required for achieving a 0.9 (black) or 0.97 (red) inference rate as a function of the alphabet size. As indicated above, as generally known, the data stored in every practical data storage, generally contain an error correction code capable of overcoming the residual errors of resulting from 0.97, 0.9 or even from lower inference rates. The circles in the section B represent empirical data and the +/x represent simulated data. Section C in the figure illustrates the inference rates for letters in $\Sigma_3$ as a function of sequencing depth. The positions of the letter in the composite DNA oligo (starting from the 5' end) are indicated at the top and the data for each letter is ordered by position. Section D in the figure illustrates the inference rates for the different letters of the "IUPAC" alphabet (all equimolar letters—letters for which 2,3 or 4 standard bases are mixed with equal concentrations) as function of position in the composite DNA sequence (starting from the 5' end). The letters are colored according to their "native" alphabet resolution (green for R=1, yellow for R=2, orange for R=3 and red for R=4). The black line represents a linear trend, excluding the four standard DNA letters and the single letter and "N".

Proof of Concept and Molecular Implementation

The inventors have encoded a short input message ("DNA STORAGE ROCKS!") using an encoding pipeline such as that disclosed in Method 200 described above, and more specifically utilized the encoding pipeline including the following steps:

Mapping of the message to a binary sequence using the standard ASCI code for the English language.

Huffman coding the binary sequence into a sequence of composite DNA letters of resolution k using the complete Shakespeare corpus to generate the Huffman coding scheme.

To achieve equal sequence length for all designed oligos (of different resolutions k) the inventors repeated the encoded message to fit a predetermined length of 42 bases.

This process was performed for four different resolutions k=1,2,3 and a special case in which the composite alphabet consists of only equimolar combinations of bases (representing the 15 different letters of the IUPAC alphabet, M=15).

The populations of encoded composite DNA sequences, for each of the above four composite alphabet configurations, were inserted into a synthetic construct containing amplification primer templates, a unique molecular identifier (UMI) and a barcode to obtain a total oligo length of 99 bases. The four designed oligonucleotides were then commercially synthesized, amplified using PCR primers from the Illumina small RNA sequencing kit, and sequenced using an Illumina Mi-Seq.

Sequencing was performed to read the encoded data. 5,421,556 50 bp paired-end reads were obtained of the four different samples. The read pairs were merged to generate 4,855,676 reads, 95% of which had a designed length of 52 bases. Then the reads were split into four different samples using the barcode (ID-SEG values) value yielding about 25% of the reads per each sample alphabet.

Next, the original message was decoded using a decoding pipeline such as that described with reference to method 400 above. More specifically in this case the message decoding/reading included/consisted of the following steps:

Reading of the sample reads
Filtering of the reads based on read length and removing reads containing undetermined bases ("N" output in the sequencing) and reads of length different than 52 bases.
Inference of the composite sequence using the inference mechanisms described above.
Decoding of the original messages using the same Huffman coding used for encoding.

For each alphabet sample, the ability to decode the entire message (including the repetition introduced to equalize oligo length), and also only the first occurrence of the original encoded message text, was tested. To test for the required sequencing depth for each sample alphabet representing a specific resolution, different numbers of reads were sampled from the total sequencing depth sampled, and the decoding process was repeated for each such sub-sample of the sequencing depth. The sampling process was carried out/repeated for 100 times for each sampling rate, and the inference rates and the overall decoding outcome for each sample were recorded.

Error Analysis for Composite DNA Letters

The inventors designed a synthetic composite DNA oligo using the same overall design with the following alterations:

The barcode and UMI were removed (unnecessary for this analysis)
The length of the composite DNA sequence was 145 bases yielding a total oligo length of 192 bases.
The 145 composite bases consisted of all the possible pairs of composite letters. This oligo design was constructed as a de Bruijn sequence using the following methodology. A balanced circular de Bruijn sequence over an alphabet of 12 letters composed of the eleven composite letters (15 IUPAC letters minus the four standard bases) plus one extra letter was constructed. The occurrences of the extra letter were then replaced by the standard DNA bases in a cyclic manner.

This 192 base oligo (de Bruijn+primers) was then synthesized, processed and sequenced using similar procedures to the above with the following differences:

The oligo was synthesized using IDT Ultramer synthesis technology for long synthetic DNA oligos
Sequencing was performed using the Nano Mi-Seq kit yielding 150 bp paired end reads.
As a result 1,086,991 150 bp paired-end reads were obtained. The read pairs were merged to generate 1,017,813 reads, 90% of which had the designed length of 145 bases. Then a similar pipeline to the one described above was used to calculate inference rates for each position in the sequence and to investigate the properties of the error rates.

The results are described in FIG. 12.

Composite DNA Fountain

The inventors altered the DNA fountain code [5] to support composite DNA sequences, creating what we called a composite DNA fountain system:

Given an input message and a composite DNA resolution the additional parameters described in the DNA fountain parameters were calculated.
Binary droplets were generated in a similar manner to the original procedure.
The conversion of the binary droplet to a DNA sequence was altered so that the droplet seed, which is encoded in the first 4 bytes, was converted to a standard DNA sequence acting as a barcode, and the rest of the binary sequence was converted to a composite DNA sequence of the desired resolution.
The screening of the droplets was altered so that biochemical constrains were only tested on the barcode sequence and an additional barcode filtering step was added to ensure a sufficient difference between every pair of barcodes used in the fountain.
The decoding sequence was split into two steps. First the reads representing the same droplet using the barcode sequence, were grouped. Then the composite DNA sequence was inferred. After this composite inference step, the standard fountain code decoding procedure followed.

To test the feasibility of the suggested composite DNA fountain system, the inventors encoded the same message file of 2,116,608 bytes used in [3] using composite DNA in resolutions k=2,4,6,8,10, and simulated reads of different depths for each of the composite resolutions, and examined the minimal depth required to successfully decode the original binary message.

Thus the present invention provides novel systems and methods introducing the use of composite molecular/monomer alphabet DNA, to leverages properties of molecular based data storage and attain higher density based storage systems. Composite DNA/molecular alphabet schemes can be combined with other approaches to increase capacity and fidelity of molecular/DNA based storage systems. For instance, as will be appreciated by those versed in the art, without departing from the present invention, the composite alphabet scheme of the present invention can be combined with orthogonal base pair techniques such as disclosed in [7], efficient coding techniques such as disclosed in [3], [8], [9] and/or with random access approaches such as disclosed in [6], [9], [10].

The invention claimed is:

1. A method for storing data comprising:
providing at least one data-block for encoding data in at least one respective population of molecular sequences, said molecular sequences comprising respective molecules which comprise sequences comprising a number Z of different types of basic molecular building-blocks $\{E^n\}|_{n=1\ to\ z}$, by which the data of the data-block is encoded;
encoding the data of the data-block in a sequence $S'=(\pi^1, \pi^2, \ldots, \pi^k \ldots, \pi^{K-1}, \pi^K)$ of encoded letters $\{\pi^k\}$ belonging to an alphabet $\Sigma$, whereby an identity of a letter $\pi^k \in \Sigma$ encoded at a location k in the data-block is indicated by the types of basic molecular building-blocks occurring at the location k in a multitude of molecular sequences of the population, wherein said alphabet $\sigma$ has a size M greater than the number Z of different types of basic molecular building-blocks used in the data storage system (M>Z), and each alphabet letter $\sigma_m$ in the alphabet $\Sigma=\{\sigma_m\}|_{m=1\ to\ M}$ is defined by a vector $P_m^n$ indicative of a composition of the types of basic molecular building-blocks to which the alphabet letter $\sigma_m$ corresponds and whereby a $P_m^n$ in the vector is indicative of whether a basic molecular building-block $M^n$ of certain type n ($1 \le n \le Z$) should occur at a location k in one or more molecular sequences of the population in case the encoded letter $\pi^k$ at that location k, corresponds to the alphabet letter om; and synthesizing said at least one population of molecular sequences in accordance with the sequence S, wherein at each location k in a plurality of the molecules of the at least one respective population of molecular sequences a respective composition of the types of basic molecular building-blocks correspond to a respective letter in the sequence S.

2. The method claim 1, wherein data is stored in a plurality of populations of the molecular sequences defining a respective plurality of data-blocks encoding data in the data storage system; and wherein each molecular sequence of the molecular sequences includes a population identification segment comprising an identifying sequence of molecular building-blocks indicative of the population with which said molecular sequence is associated; and wherein said identifying sequence is different in molecular sequences associated with different ones of said plurality of populations.

3. The method of claim 2, wherein the molecular building-blocks of said identifying sequence are selected from said Z types of basic molecular building-blocks.

4. The method of claim 2, wherein a difference between identifying sequences that are used in population identification segments of different respective populations exceeds a predetermined threshold measured by a certain predetermined distance metric of strings.

5. The method of claim 2, wherein molecular sequences of one or more of said plurality of populations are contained together in a common region; and wherein molecular sequences associated with a same population can be exclusively selected by utilizing binding molecules configured and operable for selectively binding to the population identification segment of the molecular sequences associated with said same population.

6. The method of claim 1, comprising wherein data is stored in a plurality of populations of the molecular sequences defining a respective plurality of data-blocks encoding data in the data storage system, and comprising a structure defining a plurality of distinct regions at which molecular sequences of different respective populations reside respectively; and wherein the molecular sequences of different respective populations reside exclusively and respectively at said distinct regions.

7. The method of claim 1, wherein said types of basic molecular building-blocks comprise at least A, C, G, and T nucleotides and/or chemical modifications thereof.

8. The method of claim 1, wherein said types of basic molecular building-blocks are predetermined oligomers of a same length.

9. The method of claim 1, wherein the vector $\{P_m^n\}|_{n=1\ to\ z}$ is a probability vector defining the alphabet letter $\sigma_m$ and $P_m^n$ indicates a probability that a basic molecular building-block $E^n$ of type n, $1 \le n \le Z$, appears at the location k of a storage segment of a molecular strand of said at least one population in case the letter $\pi^k$ which is encoded at that location, k, corresponds to the alphabet letter $\sigma_m$.

10. The method of claim 9, wherein said at least one population of molecules is adapted to being read with N fold nominal sequencing depth or higher, and wherein each encoded letter $\pi^k$ being read from the position k is represented by an observed probability vector $X^k = \{x^k(E^n)/N\}|_{n=1\ to\ z}$ whereby $x^k(E^n)$ is a number of times the basic molecular building-block of type $E^n$ was read in the location k out of the N fold sequencing depth, being thereby indicative of an observed probability that the basic molecular building-blocks of type $E^n|_{n=1\ to\ z}$ appear in the location k.

11. The method of claim 10, wherein mapping between an observed probability vector $X^k$ at the location k and an inferred alphabet letter $\pi^k$ is performed by determining an alphabet letter $\sigma^k$ satisfying a minimum divergence from the observed probability vector $X^k$, $\sigma^k = \text{ArgMin} [\{\sigma_m\}_{m=1\ to\ M} | D(\sigma_m, X^k)]$, where D is a divergence function.

12. The method of claim 11, wherein the divergence function $D(\sigma_m, X^k)$ is at least one of the following:
an LP distance function;
Euclidean distance $D(\sigma_m, X^k) = \sigma_m - X^k\|$;
Kullack-Leibler divergence $D(\sigma_m, X^k) = KL(\sigma_m, X^k)$.

13. The method of claim 1 wherein the vector $P_m^n$ defining each alphabet letter $\sigma_m$ in the alphabet $\Sigma$ is probability vector $\sigma_m = \{P_m^n\}|_{n=1\ to\ z}$ and whereby $P_m^n$ designates a probability of the appearance of basic molecular building-block of type n at location k in the molecular sequences of the population in case the encoded letter $\pi^k$ at that location k, corresponds to the alphabet letter $\sigma_m$.

14. A data storage system, comprising at least one population of molecular sequences having data stored thereon according to the method of claim 1.

15. A molecular label comprising the data storage system according to claim 14, wherein said at least one data-block is being respectively encoded by the at least one population of molecular sequences.

16. A method for reading data stored in a molecular data storage system, the method comprising at least the following operations:
(i) providing a molecular data storage system comprising a population of molecular sequences defining a data-block of the system, said molecular sequences comprising respective molecules formed with a number Z of different types of basic molecular building-blocks $\{E^n\}|_{n=1\ to\ z}$, by which the data of the data-block is encoded;
(ii) applying sequencing of N fold nominal sequencing depth to the population of molecular sequences to determine, per each location k out of 1 to K locations of a storage segments of the molecular sequences of the population, an observed probability vector $X^k = \{x^k(E^n)/N'\}|_{n=1\ to\ Z}$ whereby $x^k(E^n)$ is a number of times, out of an N' fold actual sequencing depth obtained for the population, at which a basic molecular building-block of type $E^n$ was found in the location k in a plurality of said molecules of said population of molecular sequences;
(iii) associating each observed probability vector $X^k$ with one of alphabet letters $\{\sigma_m\}$ of an alphabet $\Sigma = \{\sigma_m\}|_{m=1\ to\ M}$, whereby a size of said alphabet $\Sigma$ is greater than the number Z of the different types of basic molecular building-blocks, $|\Sigma| > Z$, and wherein said letters $\{\sigma_m\}$ of the alphabet $\Sigma$ comprise composite letters, each composite letter being defined by a vector $\sigma_m = \{P_m^n\}|_{n=1\ to\ z}$ which includes two or more non-zero probabilities $P_m^n$ of two or more different respective types of the basic molecular building-blocks; said associating comprises, per each of the locations k=1 to K, mapping the observed probability vector $X^k$ at said location k to one letter $\sigma^k \in \Sigma = \{\sigma_m\}|_{m=1 \text{ to } M}$ of the alphabet $\Sigma$ by determining the alphabet letter $\sigma^k$ whose vector satisfies a minimum divergence from the observed probability vector $X^k$, $\sigma^k = \text{ArgMin} [\{\sigma_m\}_{m=1 \text{ to } M}| D (\sigma_m, X^k)]$, where D is a divergence function; thereby determining a sequence $S'' = \{\sigma^k\}|_{k=1 \text{ to } K}$ of letters of the alphabet $\Sigma$ being inferred from the molecular data storage system and indicative of the data stored by said data-block.

17. The method of claim 16 wherein the vector $\{P_m^n\}$ m defining each alphabet letter $\sigma_m$ in the alphabet $\Sigma$ is a probability vector and whereby $P_m^n$ designates the probability of an appearance of basic molecular building-block of type n at location k in the molecular sequences of the population when encoded letter $\pi^k$ at that location k, corresponds to the alphabet letter $\sigma_m$.

18. The method of claim 17 wherein said sequencing depth N is a function of a resolution parameter R of the data storage system;
wherein a size [$\Sigma$] of the alphabet, being the number of letters therein, is given by $$M = |\Sigma| = \binom{R+Z-1}{R}$$

whereby Z is a number of distinct types of basic given by molecular building-blocks and R is a resolution parameter indicative of an identifiable resolution of the probability at which basic molecular building-blocks of a different types appear in each location of a plurality of monomer strings; and
wherein the resolution R is defined as one over the minimum of probabilities $P_m^n$ of the basic molecular building-blocks appearing in a definition of the letters $\{\sigma_m\}|_{m=1 \text{ to } M}$ of the alphabet 2, such that $R = 1/\text{Min}_{n,m1,m2}[(\text{Abs }(P_{m1}^n - P_{m2}^n))]$ for any type of basic molecular building-block indexed $1 \leq n \leq Z$, and any pair of distinct letters m1≠m2.

19. The method of claim 16 wherein the divergence function $D(\sigma_m, X^k)$ is at least one of the following:
an LP distance function;
Euclidean distance $D(\sigma_m, X^k) = \|\sigma_m - X^k\|$;
Kullack-Leibler divergence $D(\sigma_m, X^k) = KL(\sigma_m, X^k)$.

20. A data reader system adapted to read data stored in a molecular data storage system, comprising:
a) a sequencing control module configured and operable for connecting to a sequencing system and for operating the sequencing system to sequence a population of molecular sequences with at least N fold nominal sequencing depths and determine an observed probability vector $X^k = \{x^k(E^n)/N\}|_{n=1 \text{ to } z}$ per each location k out of 1 to K locations of a storage segments of the molecular sequences of the population, whereby $x^k(E^n)$ in the observed probability vector $X^k$ is indicative of a number of times, out of the N fold sequencing depth, at which a basic molecular building-block of type $E^n$ was found in the location k in a plurality of molecular sequences of the population, said molecular sequences comprising respective molecules; and
b) a data inference processing module configured and operable for determining a sequence $\{\sigma^k\}|_{k=1 \text{ to } K}$ of letters of the alphabet $\Sigma$ being inferred from the population of molecular strands/sequences.

21. A method for fabricating a molecular data storage system, the method comprising:
a. providing a support substrate having one or more spatially separated regions at which one or more respective populations of molecular sequences can be synthesized;
b. providing one or more blocks of data to be respectively encoded by the one or more respective populations of molecular sequences which are to be synthesized at said one or more spatially separated regions respectively;
wherein said one or more blocks of data are coded by a sequence of letters $\{\sigma^k\}_{k=1 \text{ to } K}$ of an alphabet $2 = \{\sigma_m\}|_{m=1 \text{ to } M}$ of size $|\Sigma| = M$, each letter $\sigma_m$ of the $\Sigma$ being defined by a probability vector $\sigma_m\{P_m^n\}|_{n=1 \text{ to } z}$;
c. per each block of data, synthesizing a corresponding population of molecular sequences at a respective region of said one or more spatially separated regions, said molecular sequences comprising respective molecules;
whereby the molecular sequences of the population comprise strings comprising a number Z<M of different types of basic molecular building-blocks $\{E^n\}|_{n=1 \text{ to } z}$, by which the block of data is encoded; and
wherein said synthesizing of the population of molecular sequences at the respective region includes synthesizing the sequences of letters $\{\sigma^k\}|_{n=1 \text{ to } k}$ of said block of data by: depositing, per each letter $\sigma^k$, a composition of basic molecular building-blocks $\{E^n\}|_{n=1 \text{ to } z}$ of said Z different types with relative concentrations $\{C(E^n)\}|_{n=1 \text{ to } z}$ corresponding to the probability vector $\{P^{k,n}\}|_{n=1 \text{ to } z}$ of the respective letter $\sigma^k$.

22. The method of claim 21 wherein said depositing comprises:
(i) providing said composition of basic molecular building-blocks with said relative concentrations, in which the basic molecular building-blocks are "blocked" from at least one end thereof to prevent their binding to one another;
(ii) placing said composition of basic molecular building-blocks at said respective region to thereby enable binding of said basic molecular building-blocks to molecules at said region;
(iii) washing said region to remove un-bonded basic molecular building-blocks of said composition; and
(iv) applying un-blocking treatment to "un-block" basic molecular building-blocks of said composition that are bounded to molecules at said region.

23. The method of claim 21 wherein said region of the support substrate comprises cleavable molecules adapted to bind with said basic molecular building-blocks, such that the basic molecular building-blocks of the first composition that is being first deposited on said region, are bounded to said cleavable molecules; and
wherein the method comprises harvesting said population of molecules from said respective region by cleaving said cleavable molecules.

24. The method of claim 21 wherein said synthesizing of the population of molecule sequences comprises synthesizing similar population identification segments, in all molecule sequences of said population; whereby the population identification segment of each molecular sequence is indicative of the population with which the molecular sequence is associated and is different in molecular sequences of different populations.

25. A molecular data storage fabrication system adapted to fabricate a molecular data storage structure, the molecular data storage fabrication system comprising:
- one or more containers adapted for containing said basic molecular building-blocks $\{E^n\}|_{n=1\ to\ z}$ and/or mixtures thereof;
- a fabrication head fluidly connected to said one or more containers and configured and operable for controlled deposition of a volume of basic molecular building-blocks contained in a one or more selected containers out of said one or more containers; and
- a control unit configured and operable to operate the fabrication head for carrying out the following:
    - providing at least one block of data to be encoded by synthesizing a respective population of molecular sequences encoding said block of data, on a region designated for carrying said population, said molecular sequences comprising respective molecules;
- wherein said block of data is coded by a sequence of encoded letters $\{\sigma^k\}_{k=1\ to\ K}$ belonging to an alphabet $\Sigma$ of size $|\Sigma|=M>Z$ comprising one or more letters $\Sigma=\{\sigma_m\}|_{m=1\ to\ M}$, whereby each letter om is defined by a probability vector $\sigma_m=\{P_m^n\}|_{n=1\ to\ Z}$ indicative of expected probabilities $\{P_m^n\}$ that basic molecular building-blocks of one or more respective types $\{E^n\}$ are synthesized at a designated location k in the molecular sequences at which the letter is encoded;
- wherein the letters $\{\sigma_m\}|_{m=1\ to\ M}$ of the alphabet $\Sigma$ comprise one or more composite letters whose probability vectors $P_m^n$ include two or more probabilities having non-zero expected value;
- synthesizing the population of molecular sequences encoding said block of data at the designated region, by operating said fabrication head, at said designated region to sequentially deposit from said one or more containers volumes of basic building block molecules corresponding to the sequence of letters $\{\sigma^k\}|_{k=1\ to\ K}$ encoding said block of data; whereby composite letters are synthesized by depositing a mixture of types of basic building block molecules with concentrations matching the probability vector of the composite letter, obtained from one of said one or more containers.

* * * * *